United States Patent
Brunet et al.

(10) Patent No.: US 8,271,326 B1
(45) Date of Patent: Sep. 18, 2012

(54) REFERRAL PROCESSING AND TRACKING SYSTEM

(75) Inventors: Craig Brunet, Westport, CT (US); Michael S. Goldberg, Great Neck, NY (US); Avery Kohn, New York, NY (US); Judah Libin, Woodmere, NY (US)

(73) Assignee: Newtek Business Services, Inc., New York, NY (US)

( * ) Notice: Subject to any disclaimer, the term of this patent is extended or adjusted under 35 U.S.C. 154(b) by 1044 days.

(21) Appl. No.: 11/516,842

(22) Filed: Sep. 7, 2006

(51) Int. Cl.
*G06Q 30/00* (2012.01)
(52) U.S. Cl. .......................... 705/14.16; 705/35; 705/300
(58) Field of Classification Search .............. 705/14.16, 705/300, 35
See application file for complete search history.

(56) References Cited

U.S. PATENT DOCUMENTS

| | | | |
|---|---|---|---|
| 7,337,133 B1* | 2/2008 | Bezos et al. | 705/27 |
| 7,483,847 B1* | 1/2009 | Rymer et al. | 705/35 |
| 7,769,649 B1* | 8/2010 | Eliscu | 705/35 |
| 2002/0147625 A1* | 10/2002 | Kolke, Jr. | 705/9 |
| 2005/0171935 A1* | 8/2005 | Nowak et al. | 707/3 |
| 2005/0187872 A1* | 8/2005 | Schmidt et al. | 705/40 |
| 2005/0261929 A1* | 11/2005 | Hansen et al. | 705/1 |
| 2006/0277113 A1* | 12/2006 | Richards | 705/26 |
| 2007/0083403 A1* | 4/2007 | Baldwin et al. | 705/7 |
| 2008/0033813 A1* | 2/2008 | Khachatryan | 705/14 |

* cited by examiner

*Primary Examiner* — Janice A. Mooneyham
*Assistant Examiner* — Kira Nguyen
(74) *Attorney, Agent, or Firm* — Stephen C. Glazier; K&L Gates LLP

(57) ABSTRACT

Systems and methods are disclosed for tracking, reporting and performing processing activities and transactions in association with referral data and related information for a variety of product and service offerings.

30 Claims, 56 Drawing Sheets

FIG. 4

SUBMIT REFERRALS

PLEASE FILL IN THE ENTIRE FORM TO SUBMIT YOUR REFERRAL ONLINE. ALL FIELDS SHOULD INCLUDE THE REFERRAL COMPANY'S INFORMATION AND NOT YOUR OWN. YOU MAY ALSO PRINT AND MANUALLY FILL OUT THE REFERRAL FORM AND FAX IT TO THE PROGRAM MANAGER AT 212-643-0575

- COMPANY
- CONTACT
- BUSINESS TYPE (DENTIST, RESTAURANT, ETC.)
- ADDRESS 1
- ADDRESS 2
- CITY
- STATE — SELECT STATE
- ZIP
- BUSINESS PHONE
- HOME PHONE
- CELL PHONE
- FAX

FIG. 5A

EMAIL

URL

LOAN AMOUNT (IF APPLICABLE) $

REFER TO COMPANY: NEWTEK FINANCIAL INFORMATION SYSTEMS

LOAN PURPOSE:
WORKING CAPITAL
EQUIPMENT / FURNITURE / FIXTURES
RE-PURCHASE / CONSTRUCTION
REFINANCE
STARTUP
N/A

ONE OR MORE OF THE ABOVE OPTIONS MUST BE SELECTED AT ALL TIMES

NOTES

SUBMIT REFERRAL

DONE

FIG. 5B

SUMMARY OF REFERRALS ASSIGNED TO YOU

| COMPANY | REFERRALS ASSIGNED TO YOU THAT ARE OPEN | REFERRALS ASSIGNED TO YOU THAT ARE CLOSED | REFERRALS ASSIGNED TO YOU THAT ARE DEAD |
|---|---|---|---|
| NEWTEK FINANCIAL INFORMATION SYSTEMS | 0 | 0 | 0 |
| NEWTEK TAX SERVICES | 0 | 0 | 0 |
| NEWTEK MERCHANT SOLUTIONS | 1 | 0 | 16 |
| NEWTEK SMALL BUSINESS FINANCE | | | |
| TOTAL LOAN AMOUNT | $228,000 | NA | $8,235,000 |
| NEWTEK IT SERVICES | 0 | 0 | 0 |
| NEWTEK INSURANCE | 0 | 0 | 0 |
| NEWTEK SMALL BUSINESS FINANCE CO-ORIGINATION | 0 | 0 | 0 |

SUMMARY OF REFERRALS ASSIGNED TO YOUR EMPLOYEES

| COMPANY | REFERRALS ASSIGNED TO YOUR EMPLOYEES THAT ARE OPEN | REFERRALS ASSIGNED TO YOUR EMPLOYEES THAT ARE CLOSED | REFERRALS ASSIGNED TO YOUR EMPLOYEES THAT ARE DEAD |
|---|---|---|---|
| NEWTEK FINANCIAL INFORMATION SYSTEMS | 11 | 4 | 65 |
| NEWTEK TAX SERVICES | 1 | 0 | 17 |
| NEWTEK MERCHANT SOLUTIONS | 65 | 30 | 49 |
| NEWTEK SMALL BUSINESS FINANCE | 784 | 125 | 2281 |
| TOTAL LOAN AMOUNT | $372,090,197 | $38,476,661 | $778,311,949 |
| NEWTEK IT SERVICES | 0 | 0 | 0 |
| NEWTEK INSURANCE | 0 | 0 | 1 |
| NEWTEK SMALL BUSINESS FINANCE CO-ORIGINATION | 11 | 0 | 9 |

REFERRALS ASSIGNED TO YOU AND YOUR EMPLOYEES
INQUIRED
CLOSED
SUSPENDED
DEAD

*FIG. 6A*

REFERRALS ASSIGNED TO YOU THAT ARE CURRENTLY OPEN

| DATE | COMPANY | CONTACT | REFERRED TO | ASSIGNED TO | STATUS CODES | LOAN AMOUNT | ADDITIONAL NOTES | ESTIMATED DATE TO CLOSE | SUBMITTED BY | SUBMITTED BY COMPANY | APPLICATION ID |
|---|---|---|---|---|---|---|---|---|---|---|---|
| 10/13/04 02:35:37 PM 22 DAYS | MAILTEC INC. | ROSS CARACE | NEWTEK SMALL BUSINESS FINANCE | MOUCHACCA, CARMEN | PART 2 COMPLETED (ASSEMBLING DOCUMENTS / SIGNATURES) | $228,000 | SPOKE WITH CUSTOMER AND COMPLETED ON-LINE APPLICATION - THE CUSTOMER HAS BEEN | 10/06/04 | MOUCHACCA, CARMAN | NEWTEK SMALL BUSINESS FINANCE | NA |

REFERRALS ASSIGNED TO YOUR EMPLOYEES THAT ARE OPEN

| DATE | COMPANY | CONTACT | REFERRED TO | ASSIGNED TO | STATUS CODES | LOAN AMOUNT | ADDITIONAL NOTES | ESTIMATED DATE TO CLOSE | SUBMITTED BY | SUBMITTED BY COMPANY | APPLICATION ID |
|---|---|---|---|---|---|---|---|---|---|---|---|
| 10/07/04 09:17:03 AM 73 DAYS | NO COMPANY NAME | JOHN F. WABE, JR. | NEWTEK SMALL BUSINESS FINANCE | LITTLE-WOOD, BELINDA | ESTABLISHING INITIAL CONTACT | NA | RECEIVED A RESPONSE FROM EMAIL 10/06. CLIENT IS BUSY WORKING ON A PROJECT PROPOSAL. WILL FINISH | 08/16/04 | VETERANS CORPORATION | THE VETERANS CORPORATION | 10487 |
| 10/05/04 08:35:31 AM 23 DAYS | NO COMPANY NAME | CARMELA ALESEGAZ | NEWTEK SMALL BUSINESS FINANCE | LITTLE-WOOD, BELINDA | PRE-QUALIFIED | $80,000 | SIGNATURE DOCUMENTS HAVE BEEN SENT TO CLIENT. | 10/05/04 | VETERANS CORPORATION | THE VETERANS CORPORATION | NA |

BUSINESS PHONE: 630 926 3524 X
HOME PHONE:
CELL PHONE:
FAX:
EMAIL JPERRY828@COMCAST.NET
URL

SAVE CHANGES

HOME | FAQ | PARTICIPATING NEWTEK SERVICES | NEWTEK REFERRAL TRAINING | CONTACTS
SUBMIT REFERRALS | VIEW STATUS REPORTS | UPDATE STATUS REPORTS
COPYRIGHT 2003 NEWTEK REFERRALS. ALL RIGHTS RESERVED.

*FIG. 9B*

USER INFORMATION:

UPDATE

EDIT PASSWORD
EDIT USER

REFERRALS SUBMITTED BY YOU AND YOUR EMPLOYEES

OPEN
INQUIRIES
CLOSED
DEAD

REFERRALS ASSIGNED TO YOU AND YOUR EMPLOYEES

OPEN

*FIG.10B*

Newtek Referral System

HARVEST STRATEGIES

HOME | FAQ | PARTICIPATING NEWTEK SERVICES | NEWTEK RESOURCES AND TRAINING | CONTACTS

USER SITE LOGIN SUMMARY

THERE ARE 1193 RECORDED LOGINS

| NAME | DATE |
|---|---|
| AVI KOHN | 10/14/04 12:49:31 PM |
| AVI KOHN | 10/14/04 11:52:39 AM |
| AVI KOHN | 10/13/04 04:38:33 PM |
| AVI KOHN | 10/13/04 04:36:39 PM |
| AVI KOHN | 10/13/04 04:31:22 PM |
| AVI KOHN | 10/13/04 04:07:21 PM |
| AVI KOHN | 10/12/04 05:21:04 PM |
| AVI KOHN | 10/12/04 02:58:00 PM |
| AVI KOHN | 10/12/04 10:24:30 AM |
| AVI KOHN | 10/11/04 10:09:56 AM |
| AVI KOHN | 10/11/04 10:09:47 AM |

YOUR SEARCH HAS RETURNED 61 REFERRALS FOR $0

| DATE | COMPANY | CONTACT | REFERRED TO | ASSIGNED TO | STATUS CODE | LOAN AMOUNT | ADDITIONAL NOTES | ESTIMATED DATE TO CLOSE | SUBMITTED BY | SUBMITTED BY COMPANY | APPLICATION ID |
|---|---|---|---|---|---|---|---|---|---|---|---|
| 08/30/04 12:43:19 PM 45 DAYS | ABILITY TO EDIT USER NAMES | MEDIUM | NEWTEK REFERRAL SYSTEM | KOHN, AVI | REFERRAL SUBMITTED | NA | ABILITY TO EDIT USERNAMES. | 09/13/04 | GOLDBERG, MICHAEL | HARVEST STRATEGIES | NA |
| 08/31/04 10:57:09 AM 44 DAYS | ABILITY TO SEE ACCESS LEVELS | MED/HIGH | NEWTEK REFERRAL SYSTEM | KOHN, AVI | REFERRAL SUBMITTED | NA | ABILITY TO SEE PERMISSIONS LEVELS IN THE REFERRAL SYSTEM. LOCATED IN THE ALLIANCE | 09/14/04 | GOLDBERG, MICHAEL | HARVEST STRATEGIES | NA |
| 07/09/04 08:45:54 AM 150 DAYS | ABILITY TO SEE USERS WHO HAVE CREATED ACCOUNTS PER COMPANY | MEDIUM | NEWTEK REFERRAL SYSTEM | KOHN, AVI LIBIN, JUDAH | SUSPENDED | NA | IS A PART OF CREDIT UNION REPORT. | 05/31/04 | GOLDBERG, MICHAEL | HARVEST STRATEGIES | NA |
| 10/06/04 02:28:20 AM 8 DAYS | ABILITY TO SUBMIT REFERRAL FOR MULTIPLE NEWTEK SERVICES | MEDIUM | NEWTEK REFERRAL SYSTEM | KOHN, AVI | REFERRAL SUBMITTED | NA | IN THE SUBMIT REFERRALS FORM WE CAN GET RID OF THE DROP DOWN. IF A CLIENT WANTS MORE THAN | 12/15/04 | GOLDBERG, MICHAEL | HARVEST STRATEGIES | NA |

FIG. 15B

| | | | | | | | | | |
|---|---|---|---|---|---|---|---|---|---|
| 05/06/04 12:58:03 PM 162 DAYS | ACTIVATE USER LOG | MIKE G | NEWTEK REFERRAL SYSTEM | KOHN, AVI | CLOSED NO COMPENSATION NECESSARY | NA | IMPLEMENTED | 05/19/04 | GOLDBERG, MICHAEL | HARVEST STRATEGIES | NA |
| 07/06/04 10:19:51 PM 155 DAYS | ADD A NEW COMPANY PERMISSION DWG | LOW PRIORITY | NEWTEK REFERRAL SYSTEM | KOHN, AVI | CLOSED IMPLEMENTED ON PRODUCTION SITE | NA | FINISHED | 05/26/04 | GOLDBERG, MICHAEL | HARVEST STRATEGIES | NA |
| 08/21/04 08:08:45 AM 115 DAYS | ADD AVERAGE LOAN SIZE TO FC REPORT | MEDIUM | NEWTEK REFERRAL SYSTEM | KOHN, AVI | REFERRAL SUBMITTED | NA | ADD AVG. LOAN SIZE TO THE FC REPORT. NEEDS TO BE ANOTHER COLUMN PER STATUS AND THEN A TOTAL AVG. ON | 07/05/04 | GOLDBERG, MICHAEL | HARVEST STRATEGIES | NA |
| 07/06/04 10:23:21 PM 127 DAYS | ADD EXTENSIONS BOX TO BUSINESS PHONE | LOW | NEWTEK REFERRAL SYSTEM | KOHN, AVI | CLOSED IMPLEMENTED ON PRODUCTION SITE | NA | DONE :-) | 06/23/04 | GOLDBERG, MICHAEL | HARVEST STRATEGIES | NA |

*FIG. 15C*

ALLIANCE ADMINISTRATION
ADD A NEW COMPANY

ALLIANCE ADMINISTRATION

| COMPANY NAME | COMPANY ID |
|---|---|
| 1 FCU | 1518 |
| 1021 FCU | 2712 |
| 1199 SEIU FCU | 4899 |
| 167TH TFR FCU | 8023 |
| 1ST ADVANTAGE FCU | 7698 |
| 1ST ALLIANCE XXI FCU | 8847 |
| 1ST AND 7TH DISTRICT DOT ECU | 1481 |
| 1ST CHOICE CREDIT UNIION | 4354 |
| 1ST CHOICE CU | 1597 |
| 1ST CHOICE FCU | 486 |
| 1ST CITIZENS FCU | 7913 |
| 1ST COMMUNITY CREDIT UNION | 8262 |
| 1ST COMMUNITY FCU | 9326 |
| 1ST COOPERATIVE FCU | 6708 |
| 1ST CREDIT UNION | 4207 |
| 1ST GARLAND COMMUNITY FCU | 0608 |

FIG.17A

| Name | Value |
|---|---|
| 1ST GATEWAY CU | 2506 |
| 1ST LIBERTY FCU | 4294 |
| 1ST MISSISSIPPI FCU | 8596 |
| 1ST PACIFIC CU | 618 |
| 1ST PATRIOTS FCU | 6656 |
| 1ST PLATTSBURGH FCU | 4987 |
| 1ST PRIORITY FCU | 9168 |
| 1ST SECURITY CREDIT UNION | 8296 |
| 1ST SELECT FCU | 2839 |
| 1ST UNITED FCU | 873 |
| 1ST UNITED LABOR FCU | 2837 |
| 1ST UNITED SERVICES CU | 446 |
| 1ST UNIVERSAL FCU | 9329 |
| 1ST UNIVERSITY CU | 7014 |
| 310 COMMUNITY CU | 2623 |
| 3RD DISTRICT HIGHWAY FCU | 3043 |
| 49ER FCU | 491 |
| 540 IBEW CU | 5460 |
| 65 FAMILY FEDERAL CREDIT UNION | 4791 |
| 66 FCU | 5025 |
| 74TH STREET DEPOT FCU | 2132 |
| 77TH STREET DEPOT FCU | 2128 |
| 8 FLAGS FCU | 1353 |
| 998 CREDIT UNION | 8206 |
| A & S FCU | 5977 |
| A AND P FARMER JACK CU | 3495 |
| A C B A FCU | 5939 |
| A C JAACKS CREDIT UNION | 1918 |

| | |
|---|---|
| APPEAR IN NMS EMPLOYEE REPORTS: | NO ▸ |
| APPEAR IN NMS ALLIANCE REPORTS: | NO ▸ |
| MANAGER: | COFFIN ERICA ▸ |
| EMAIL: | AKOHN@NEWTEKIT.COM |
| CITY: | NEW YORK |
| STREET: | 37 OVERLOOK TERRACE AP |
| STATE: | NY |
| ZIP CODE: | 10033 |
| MANAGER NAME: | |
| MANAGER EMAIL: | BKOHN@OPTONLINE.NET |
| PHONE #: | 212  927  7777 |
| EMPLOYEE ID #: | 0 |

UPDATE USER

*FIG. 19B*

Newtek Referral System

HARVEST STRATEGIES

HOME | FAQ | PARTICIPATING NEWTEK SERVICES | NEWTEK RESOURCES AND TRAINING | CONTACTS

DISPLAY UNACTIVATED USERS

DISPLAY ACTIVE USERS

SEARCH FOR: [MOUCH]  SEARCH

USER LIST FOR: KOHN, AVI

| NAME | USER LEVEL | EMAIL | COMPANY | MANAGER |
|---|---|---|---|---|
| MOUCHACCA, CARMEN | EXECUTIVE | CMOUCHACCA@NEWTEKSBFINANCE.COM | NEWTEK SMALL BUSINESS FINANCE | DOWNS, PETER |

HOME | FAQ | PARTICIPATING NEWTEK SERVICES | NEWTEK REFERRAL TRAINING | CONTACTS
SUBMIT REFERRALS | VIEW STATUS REPORTS | UPDATE STATUS REPORTS
COPYRIGHT 2003 NEWTEK REFERRALS. ALL RIGHTS RESERVED.

| | | | |
|---|---|---|---|
| 20 | NEWTEK MERCHANT SOLUTIONS | COMMUNITY CREDIT UNION | DAVID DIXON |
| 21 | NEWTEK MERCHANT SOLUTIONS | COMMUNITY FINANCIAL FCU | MICHAEL WHOLEAN |
| 22 | NEWTEK MERCHANT SOLUTIONS | EAGLE LEGACY CREDIT UNION | MICHAEL WHOLEAN |
| 23 | NEWTEK MERCHANT SOLUTIONS | EASTERN FINANCIAL FLORIDA CU | BRIAN FLAX |
| 25 | NEWTEK MERCHANT SOLUTIONS | FAMILY SECURITY CU | DAVID DIXON |
| 26 | NEWTEK MERCHANT SOLUTIONS | FIRST SOUTH CU | DAVID DIXON |
| 27 | NEWTEK MERCHANT SOLUTIONS | FORT BELVOIR FCU | BRIAN FLAX |
| 28 | NEWTEK MERCHANT SOLUTIONS | FREMONT FIRST CENTRAL FCU | MICHAEL WHOLEAN |
| 29 | NEWTEK MERCHANT SOLUTIONS | HERMANTOWN FCU | MICHAEL WHOLEAN |
| 30 | NEWTEK MERCHANT SOLUTIONS | KLAMATH PUBLIC EFCU | MICHAEL WHOLEAN |
| 31 | NEWTEK MERCHANT SOLUTIONS | LA CAPITOL FCU | DAVID DIXON |
| 32 | NEWTEK SMALL BUSINESS FINANCE | EARL CAMBRON | JENNIFER DINCOLA |
| 33 | NEWTEK MERCHANT SOLUTIONS | MEADOW GROVE CU | MICHAEL WHOLEAN |
| 34 | NEWTEK MERCHANT SOLUTIONS | MOUNTAIN HIGH FCU | MICHAEL WHOLEAN |
| 35 | NEWTEK MERCHANT SOLUTIONS | NAPUS FCU | BRIAN FLAX |

*FIG. 22B*

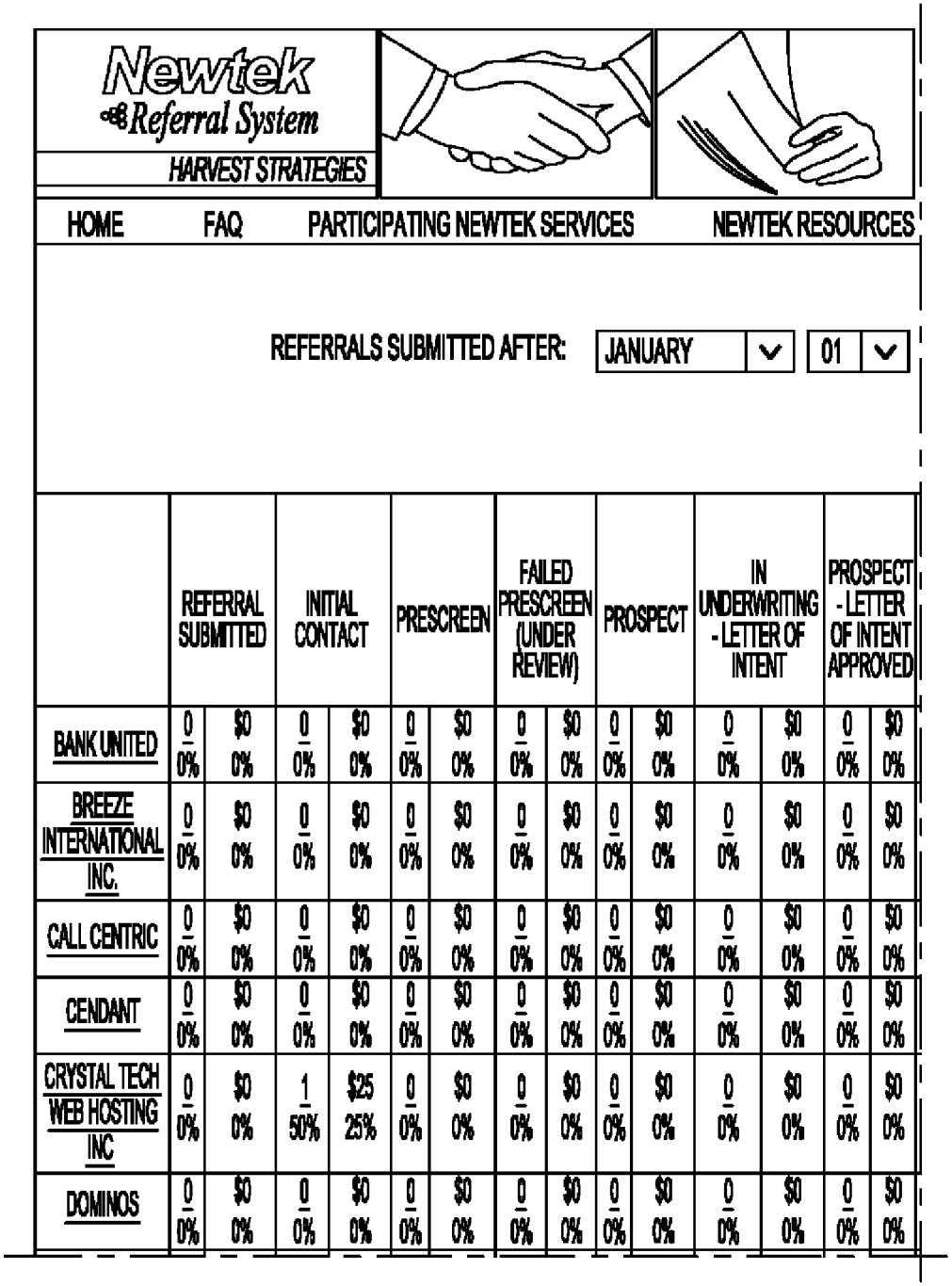
FIG.25A1

| | | | | | | | | | | | | | |
|---|---|---|---|---|---|---|---|---|---|---|---|---|---|
| FIDELITY FEDERAL BANK & TRUST | 0 | $0 | 1 | $75 | 0 | $0 | 0 | $0 | 0 | $0 | 0 | $0 | 0 | $0 |
| | 0% | 0% | 100% | 100% | 0% | 0% | 0% | 0% | 0% | 0% | 0% | 0% | 0% | 0% |
| FRANCHISE BUYER | 0 | $0 | 1 | $250 | 0 | $0 | 0 | $0 | 0 | $0 | 0 | $0 | 0 | $0 |
| | 0% | 0% | 50% | 63% | 0% | 0% | 0% | 0% | 0% | 0% | 0% | 0% | 0% | 0% |
| FRANCHISE FINANCE | 0 | $0 | 0 | $0 | 0 | $0 | 0 | $0 | 0 | $0 | 0 | $0 | 0 | $0 |
| | 0% | 0% | 0% | 0% | 0% | 0% | 0% | 0% | 0% | 0% | 0% | 0% | 0% | 0% |
| FRANCHISE SOLUTIONS | 0 | $0 | 0 | $0 | 0 | $0 | 0 | $0 | 0 | $0 | 0 | $0 | 0 | $0 |
| | 0% | 0% | 0% | 0% | 0% | 0% | 0% | 0% | 0% | 0% | 0% | 0% | 0% | 0% |
| GE COMMERCIAL FINANCE | 0 | $0 | 0 | $0 | 0 | $0 | 0 | $0 | 0 | $0 | 0 | $0 | 0 | $0 |
| | 0% | 0% | 0% | 0% | 0% | 0% | 0% | 0% | 0% | 0% | 0% | 0% | 0% | 0% |
| GENERAL MOTORS MINORITY DEALERS ASSOCIATION | 0 | $0 | 0 | $0 | 0 | $0 | 0 | $0 | 0 | $0 | 0 | $0 | 0 | $0 |
| | 0% | 0% | 0% | 0% | 0% | 0% | 0% | 0% | 0% | 0% | 0% | 0% | 0% | 0% |
| HARVEST STRATEGIES - FRANFUND, LLC | 0 | $0 | 0 | $0 | 0 | $0 | 0 | $0 | 0 | $0 | 0 | $0 | 0 | $0 |
| | 0% | 0% | 0% | 0% | 0% | 0% | 0% | 0% | 0% | 0% | 0% | 0% | 0% | 0% |
| HP BUSINESS MATCHMAKING | 0 | $0 | 0 | $0 | 0 | $0 | 0 | $0 | 0 | $0 | 0 | $0 | 0 | $0 |
| | 0% | 0% | 0% | 0% | 0% | 0% | 0% | 0% | 0% | 0% | 0% | 0% | 0% | 0% |
| INDEPENDENT BANKERS OF COLORADO | 0 | $0 | 0 | $0 | 0 | $0 | 0 | $0 | 0 | $0 | 0 | $0 | 0 | $0 |
| | 0% | 0% | 0% | 0% | 0% | 0% | 0% | 0% | 0% | 0% | 0% | 0% | 0% | 0% |
| MARLENE STOFER | 0 | $0 | 0 | $0 | 0 | $0 | 0 | $0 | 0 | $0 | 0 | $0 | 0 | $0 |
| | 0% | 0% | 0% | 0% | 0% | 0% | 0% | 0% | 0% | 0% | 0% | 0% | 0% | 0% |
| MERRIL LYNCH | 2 | $2,300 | 9 | $6,190 | 1 | $897 | 0 | $0 | 2 | $2,500 | 0 | $0 | 0 | $0 |

FIG. 25A2

FIG.25B1

| 0 | $0 | 0 | $0 | 0 | $0 | 0 | $0 | 0 | $0 |
|---|---|---|---|---|---|---|---|---|---|
| 0% | 0% | 0% | 0% | 0% | 0% | 0% | 0% | 0% | 0% |
| 1 | $150 | 0 | $0 | 0 | $0 | 0 | $0 | 0 | $0 |
| 50% | 38% | 0% | 0% | 0% | 0% | 0% | 0% | 0% | 0% |
| 0 | $0 | 0 | $0 | 0 | $0 | 0 | $0 | 0 | $0 |
| 0% | 0% | 0% | 0% | 0% | 0% | 0% | 0% | 0% | 0% |
| 1 | $25 | 0 | $0 | 0 | $0 | 0 | $0 | 0 | $0 |
| 100% | 100% | 0% | 0% | 0% | 0% | 0% | 0% | 0% | 0% |
| 1 | $50 | 0 | $0 | 0 | $0 | 1 | $275 | 0 | $0 |
| 33% | 10% | 0% | 0% | 0% | 0% | 33% | 52% | 0% | 0% |
| 0 | $0 | 0 | $0 | 0 | $0 | 0 | $0 | 0 | $0 |
| 0% | 0% | 0% | 0% | 0% | 0% | 0% | 0% | 0% | 0% |
| 0 | $0 | 0 | $0 | 0 | $0 | 0 | $0 | 0 | $0 |
| 0% | 0% | 0% | 0% | 0% | 0% | 0% | 0% | 0% | 0% |
| 0 | $0 | 0 | $0 | 0 | $0 | 0 | $0 | 0 | $0 |
| 0% | 0% | 0% | 0% | 0% | 0% | 0% | 0% | 0% | 0% |
| 0 | $0 | 0 | $0 | 0 | $0 | 0 | $0 | 0 | $0 |
| 0% | 0% | 0% | 0% | 0% | 0% | 0% | 0% | 0% | 0% |
| 10 | $3,850 | 0 | $0 | 0 | $0 | 2 | $500 | 3 | $2,460 |

*FIG. 25B2*

| IN UNDERWRITING - PROCESSING | IN UNDERWRITING - PROCESSING (SUBMITTED TO CREDIT COMMITTEE) | | IN UNDERWRITING - RECONSIDERATION | | ALL IN UNDERWRITING | | NEWTEK APPROVED - COMMITMENT PACKAGE FORWARDED TO CUSTOMER | | NEWTEK APPROVED - TO SBA | | S APPR | |
|---|---|---|---|---|---|---|---|---|---|---|---|---|
| 0 $0 0% 0% | 0 0% | $0 0% | 0 0% | $0 0% | 0 0% | $0 0% | 0 0% | $0 0% | 0 0% | $0 0% | 0 0% | |
| 0 $0 0% 0% | 0 0% | $0 0% | 0 0% | $0 0% | 0 0% | $0 0% | 0 0% | $0 0% | 0 0% | $0 0% | 0 0% | |
| 0 $0 0% 0% | 0 0% | $0 0% | 0 0% | $0 0% | 0 0% | $0 0% | 0 0% | $0 0% | 0 0% | $0 0% | 0 0% | |
| 0 $0 0% 0% | 0 0% | $0 0% | 0 0% | $0 0% | 0 0% | $0 0% | 0 0% | $0 0% | 0 0% | $0 0% | 0 0% | |
| 0 $0 0% 0% | 0 0% | $0 0% | 0 0% | $0 0% | 0 0% | $0 0% | 0 0% | $0 0% | 0 0% | $0 0% | 0 0% | |
| 0 $0 0% 0% | 0 0% | $0 0% | 0 0% | $0 0% | 0 0% | $0 0% | 0 0% | $0 0% | 0 0% | $0 0% | 0 0% | |

*FIG.25C1*

| | | | | | | | | | | | |
|---|---|---|---|---|---|---|---|---|---|---|---|
| 0 0% | $0 0% | 0 0% | $0 0% | 0 0% | $0 0% | 0 0% | $0 0% | 0 0% | $0 0% | 0 0% | $0 0% |
| 0 0% | $0 0% | 0 0% | $0 0% | 0 0% | $0 0% | 0 0% | $0 0% | 0 0% | $0 0% | 0 0% | $0 0% |
| 0 0% | $0 0% | 0 0% | $0 0% | 0 0% | $0 0% | 0 0% | $0 0% | 0 0% | $0 0% | 0 0% | $0 0% |
| 0 0% | $0 0% | 0 0% | $0 0% | 0 0% | $0 0% | 0 0% | $0 0% | 0 0% | $0 0% | 0 0% | $0 0% |
| 0 0% | $0 0% | 0 0% | $0 0% | 0 0% | $0 0% | 0 0% | $0 0% | 1 33% | $200 38% | 0 0% | $0 0% |
| 0 0% | $0 0% | 0 0% | $0 0% | 0 0% | $0 0% | 0 0% | $0 0% | 0 0% | $0 0% | 0 0% | $0 0% |
| 0 0% | $0 0% | 1 33% | $146 30% | 0 0% | $0 0% | 1 33% | $146 30% | 1 33% | $212 43% | 1 33% | $132 27% | 0 0% |
| 0 0% | $0 0% | 0 0% | $0 0% | 0 0% | $0 0% | 0 0% | $0 0% | 0 0% | $0 0% | 0 0% | $0 0% |
| 0 0% | $0 0% | 0 0% | $0 0% | 0 0% | $0 0% | 0 0% | $0 0% | 0 0% | $0 0% | 0 0% | $0 0% |
| 0 0% | $0 0% | 0 0% | $0 0% | 0 0% | $0 0% | 0 0% | $0 0% | 0 0% | $0 0% | 0 0% | $0 0% |
| 2 | $600 | 0 | $0 | 0 | $0 | 5 | $3,060 | 1 | $211 | 0 | $0 | 1 |

Newtek Referral System — HARVEST STRATEGIES

| HOME | FAQ | PARTICIPATING NEWTEK SERVICES | NEWTEK RESOURCES AND TRAINING |

COMPANY: NONE
SEE EMPLOYEES OF: NONE
SEE MANAGERS OF: NONE

[SEARCH]

USERS MANAGED BY EXECUTIVES OF:

| USER NAME | COMPANY NAME |
|---|---|
| ↧ | NEWTEK FINANCIAL INFORMATION SYSTEMS |
| ↧ | NEWTEK FINANCIAL INFORMATION SYSTEMS |
| ↧ | NEWTEK FINANCIAL INFORMATION SYSTEMS |
| ↧ | NEWTEK FINANCIAL INFORMATION SYSTEMS |
| ↧ | NEWTEK FINANCIAL INFORMATION SYSTEMS |
| ↧ | NEWTEK FINANCIAL INFORMATION SYSTEMS |
| ↧ | NEWTEK FINANCIAL INFORMATION SYSTEMS |
| ↧ | MERRILL LYNCH |
| ↧ | PARISHIONERS FCU |
| ↧ | KINGDOM COVENANT FCU |
| ↧ | NEWTEK FINANCIAL INFORMATION SYSTEMS |
| ↧ | WILMINGTON POSTAL FCU |
| ↧ | TMB FCU |
| ↧ | HEALTHCARE FCU |
| ↧ | TRINITY CU |
| ↧ | E CENTRAL CU |
| ↧ | CO-OP SERVICES CU |
| ↧ | MOUNTAIN HERITAGE FCU |
| ↧ | LEBLANC EMPLOYEES CREDIT UNION |

*FIG.27A*

CONTACTS

HARVERST STRATEGIES

| | USER LEVER | USERS | MANAGER | MANAGERS |
|---|---|---|---|---|
| | SALES PERSON / PACKAGER | | GOLDBERG, MICHAEL | |
| | SALES PERSON / PACKAGER | | GOLDBERG, MICHAEL | |
| | SALES PERSON / PACKAGER | | GOLDBERG, MICHAEL | |
| | SALES PERSON / PACKAGER | | GOLDBERG, MICHAEL | |
| | SALES PERSON / PACKAGER | | GOLDBERG, MICHAEL | |
| | SALES PERSON / PACKAGER | | GOLDBERG, MICHAEL | |
| | SALES PERSON / PACKAGER | | GOLDBERG, MICHAEL | |
| | SALES PERSON / PACKAGER | | GOLDBERG, MICHAEL | |
| | EXECUTIVE | | GOLDBERG, MICHAEL | |
| | EXECUTIVE | | GOLDBERG, MICHAEL | |
| | SALES PERSON / PACKAGER | | GOLDBERG, MICHAEL | |
| | EXECUTIVE | | GOLDBERG, MICHAEL | |
| | EXECUTIVE | | GOLDBERG, MICHAEL | |
| | EXECUTIVE | | GOLDBERG, MICHAEL | |
| | EXECUTIVE | | GOLDBERG, MICHAEL | |
| | EXECUTIVE | | GOLDBERG, MICHAEL | |
| | EXECUTIVE | | GOLDBERG, MICHAEL | |
| | EXECUTIVE | | GOLDBERG, MICHAEL | |
| | EXECUTIVE | | GOLDBERG, MICHAEL | |

*FIG.27B*

Newtek Referral System — HARVEST STRATEGIES

HOME | FAQ | PARTICIPATING NEWTEK SERVICES | NEWTEK RESOURCES

COMPANY: NONE
SEE EMPLOYEES OF: NONE
SEE MANAGERS OF: NONE

[SEARCH]

USERS MANAGED BY:

| USER NAME | COMPANY NAME |
|---|---|
|  | WILMINGTON POSTAL FCU |
| AUTO LINK, NAVY FCU | NAVY FCU |
| AUTO LINK, NCMIC | NCMIC |
| AUTO LINK, WILMINGTON POSTAL FCU | WILMINGTON POSTAL FCU |
| BURRIS, KARA | NAVY FCU |
| COLEMAN, CECILIA | NAVY FCU |
| COMPTON, SUSAN | NAVY FCU |
| COOPER, DONNA | NAVY FCU |
| DAGNALL, BILL | NAVY FCU |
| DAGNALL, BILLAG | NAVY FCU |
| DEAVERS, MICHAEL | NAVY FCU |
| DEVACK, TRACY | NAVY FCU |
| FELTS, JENNIFER | NAVY FCU |
| FRANCIONI, TANIA | NAVY FCU |
| GALE, KRISTI | NCMIC |
| GERHARDT, JASON | NAVY FCU |
| HANCOCK, LYNNE | NAVY FCU |
| HARVEY, MONICA | NAVY FCU |
| HERNANDEZ, DAVID | NEWTEK SMALL BUSINESS FINANCE |

*FIG. 28A*

CRITERIA SELECTIONS (REQUIRED):

NEWTEK SERVICE: [NEWTEK SMALL BUSINESS FINANCE ▾]

BEGINNING STATUS CODE: [PRESCREEN ▾]

ENDING STATUS CODE: [NEWTEK APPROVED - TO SBA ▾]

LIMIT RESULTS SO THAT ENDING STATUS CODE IS AT LEAST: [IN UNDERWRITING - RECONSIDERATION ▾]

TIME FRAME OPTIONS:

VIEW REFERRALS SUBMITTED BETWEEN: [JANUARY ▾] [01 ▾] [2003 ▾] - [SEPTEMBER ▾] [05 ▾] [2006 ▾]

○ INCLUDE REFERRALS AT BEGINNING CODE BETWEEN: [SEPTEMBER ▾] [05 ▾] [2006 ▾]

○ INCLUDE REFERRALS THAT HIT BEGINNING CODE BETWEEN: [SEPTEMBER ▾] [05 ▾] [2006 ▾]

○ INCLUDE REFERRALS UP TO AND INCLUDING BEGINNING CODE AS OF: [SEPTEMBER ▾] [05 ▾] [2006 ▾]

⦿ NONE

☐ HIT TARGET CODE BETWEEN DATES: [JANUARY ▾] [01 ▾] [2003 ▾] - [SEPTEMBER ▾] [05 ▾] [2006 ▾]

RETURN RESULTS BETWEEN DATES: [JANUARY ▾] [01 ▾] [2003 ▾] - [SEPTEMBER ▾] [05 ▾] [2006 ▾]

*FIG. 29A*

ADDITIONAL LIMITING CRITERIA (OPTIONAL):

COMPANY SUBMITTED BY: ALL COMPANIES ▸
USER SUBMITTED BY: NO USER ▸
USER ASSIGNED TO: NO USER ▸
USER SECONDARY ASSIGNED TO: NO USER ▸
USER TERTIARY ASSIGNED TO: NO USER ▸
COMPANY ASSIGNED TO: ALL COMPANIES ▸
STATE: NO STATE SEARCH ▸
LOAN RANGE: $ ▢ - $ ▢
LOAN VALUE DETERMINATION: HISTORICAL LOAN VALUES ▸

SEARCH

BEGINNING STATUS: PRESCREEN
ENDING STATUS: NEWTEK APPROVED - COMMITMENT PACKAGE FORWARDED TO CUSTOMER
AVERAGE # OF DAYS BETWEEN STATUS CODES: 57         42 BUSINESS DAYS
STANDARD DEVIATION: 42                             30 BUSINESS DAYS
MAX: 190                                           136 BUSINESS DAYS
MIN: 8                                             6 BUSINESS DAYS
% OF REFERRALS THAT MOVED FROM BEGINNING STATUS TO ENDING STATUS: #4.33%   $2.85 %
REFERRALS THAT MOVED FROM BEGINNING STATUS TO ENDING STATUS: #28          $6,038,400
SELECTED REFERRALS IN BEGINNING STATUS AS OF TODAY: #21                   $4,327,000
SELECTED REFERRALS IN ENDING STATUS AS OF TODAY: #21                      $7,061,900
EXCLUDED REFERRALS   BASE REFERRALS   MOVED REFERRALS
CORRECT DAYS DATA

*FIG. 29B*

USER INFORMATION

USER LOG

| | |
|---|---|
| USER ID: | 93 |
| LAST NAME: | ADAMO |
| FIRST NAME: | DENNIS |
| COMPANY: | NEWTEK IT SERVICES |
| TITLE: | |
| EMAIL: | DADAMO@NEWTEKIT.COM |
| PHONE: | 2123569500 |
| CLAIMED COMPANY: | |
| USER NAME: | DADAMO@NEWTEKIT.COM |
| PASSWORD: | DENNIS |
| USER LEVEL: | SALES PERSON / PACKAGER |
| ACTIVATED (1=YES 0=NO): | 0 |
| MANAGER: | GOLDBERG, MICHAEL |
| CAN SUBMIT REFERRALS (1=YES 0=NO): | 1 |
| EMPLOYEE ID: | 0 |
| MANAGER NAME: | |
| MANAGER EMAIL: | NO ONE |
| NEWTEK CONTACT: | |
| STREET: | 462 SEVENTH AVENUE 14TH FLR |
| CITY: | NEW YORK |
| STATE: | NY |
| ZIP: | 10018 |

USER INFORMATION:

[ UPDATE ]

EDIT ASSIGNMENT CAPABILITY
EDIT USER

REFERRALS SUBMITTED BY YOU AND YOUR EMPLOYEES
OPEN
INQUIRIES
SUSPENDED
CLOSED
DEAD

REFERRALS ASSIGNED TO YOU AND YOUR EMPLOYEES
OPEN
INQUIRIES
CLOSED
SUSPENDED

*FIG. 30*

| PRIORITY | SERVICE | COMPANY SUBMITTED BY | USER SUBMITTED BY | ASSIGN TO | STATE | LOAN => AMOUNT | LOAN =< AMOUNT | SERVICE LINE | ACTION |
|---|---|---|---|---|---|---|---|---|---|
| 0 REPRIORITIZE | NEWTEK MERCHANT SOLUTIONS | | RON REITER | RON REITER | 0 | | | | ⟳ |
| 0 REPRIORITIZE | NEWTEK MERCHANT SOLUTIONS | REVAM ALABAMA, LLC | | ALLISON LABEL | 0 | | | | ⟳ |
| 0 REPRIORITIZE | NEWTEK MERCHANT SOLUTIONS | | ROBERT SMITH (NMS) | BRIAN FLAX | 0 | | | | ⟳ |
| 0 REPRIORITIZE | NEWTEK MERCHANT SOLUTIONS | JCR BUSINESS SERVICES - UNITED RESTAURTANTS OF NY, INC. | | RON REITER | 0 | | | | ⟳ |
| 0 REPRIORITIZE | NEWTEK MERCHANT SOLUTIONS | KEMBA FINANCIAL CU INC | | ALLISON LABEL | 0 | | | | ⟳ |
| 0 REPRIORITIZE | NEWTEK MERCHANT SOLUTIONS | EAGLE FCU - ZACHARY 34015 | | ALLISON LABEL | 0 | | | | ⟳ |

*FIG. 31A*

| PRIORITY | SERVICE | COMPANY SUBMITTED BY | USER SUBMITTED BY | ASSIGN TO | STATE | LOAN => AMOUNT | LOAN =< AMOUNT | SERVICE LINE | ACTION |
|---|---|---|---|---|---|---|---|---|---|
| 1 REPRIORITIZE | NEWTEK MERCHANT SOLUTIONS | CAUSEYOUCARE - AUTO | | BRAIN FLAX | 0 | | | | 🔄 |
| 1 REPRIORITIZE | NEWTEK SMALL BUSINESS FINANCE | | JOSE DE LA O | JOSE DE LA O | 0 | | | | 🔄 |
| 1 REPRIORITIZE | NEWTEK MERCHANT SOLUTIONS | CAUSEYOUCARE | | BRIAN FLAX | 0 | | | | 🔄 |
| 1 REPRIORITIZE | NEWTEK MERCHANT SOLUTIONS | ALL CREDIT UNIONS | | ALLISON LABEL | 0 | | | | 🔄 |
| 1 REPRIORITIZE | NEWTEK SMALL BUSINESS FINANCE | | DIANE GALLION | DIANE GALLION | 0 | | | | 🔄 |
| 1 REPRIORITIZE | NEWTEK SMALL BUSINESS FINANCE | | JOSE DE LA O | JOSE DE LA O | 0 | | | | 🔄 |

*FIG. 31B*

REFERRAL PROCESSING AND TRACKING SYSTEM

FIELD OF THE INVENTION

The invention generally relates to processing data and other information associated with business referrals. In various embodiments, the invention more particularly relates to processing, tracking and reporting referral data in association with operation of a referral processing system.

BACKGROUND

In the business world, relationships between and among different commercial entities, firms and institutions can be varied and complex. Many business entities form partnerships and alliances to achieve their business objectives and to enhance the value of their enterprises.

In certain situations, a first business entity may choose to refer its clients to one or more other business entities, because the client may need services that the first entity cannot effectively perform or provide. For example, a financial entity such as a credit union working primarily within the small business sector may be limited in the range of banking services it can provide to its customers. Thus, to maximize the opportunities available to satisfy the client's needs, the referring entity may refer the client to a partner entity that can provide specialized services that meet a particular client need. In effect, through such a referral relationship, the referring entity can outsource certain client needs to the partner entity while still preserving its primary business relationship with the client.

In many situations, the referring business entity may be offered a financial incentive or other reward for promoting and referring the services of the partner entity. However, the origination and ultimate success or failure of such referrals by business entities can be burdensome to track and monitor. Systems and processes are needed that are sufficiently efficient and effective at receiving, storing, tracking, and reporting referral data arising from varied and complex referral arrangements. Methods or devices with sufficient real-time capabilities are needed for tracking referrals, for responding in a timely manner to customers and referral partners, and with the capability to track financials. Furthermore, referral mechanisms and tools are needed that are available and accessible in the business world to promote creation of relationships with larger financial and commercial institutions that can offer services to comparatively smaller market segments such as the small business sector.

In general, more effective and efficient systems and processes are needed for processing referral data in various business relationships.

BRIEF DESCRIPTION OF THE FIGURES

The utility of the embodiments of the invention will be readily appreciated and understood from consideration of the following description when viewed in connection with the accompanying drawings, wherein.

DESCRIPTION

Figure 1:
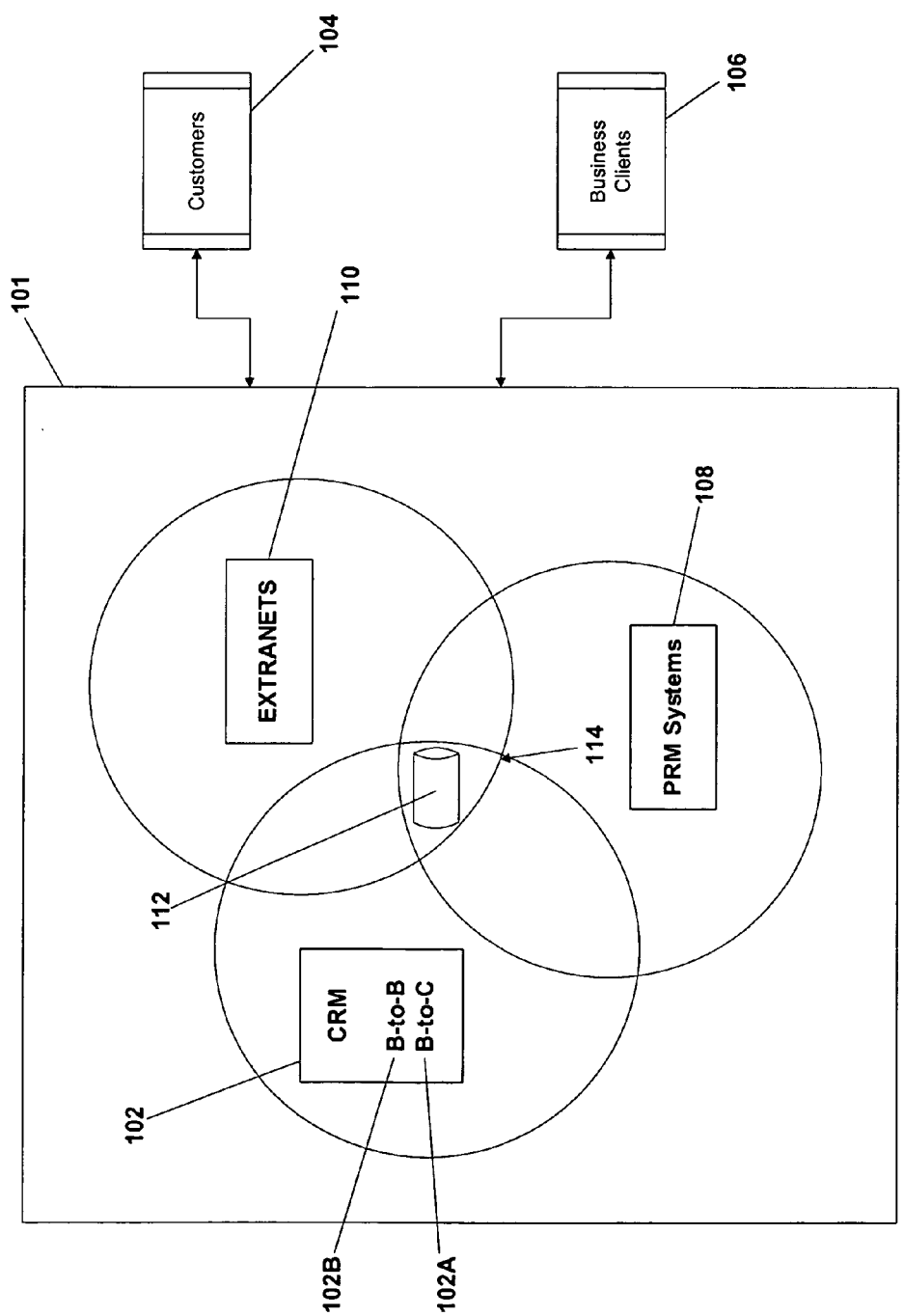
FIG. 1 includes a schematically represented system architecture diagram illustrating various aspects of the connectivity of a referral system provided in association with embodiments of the invention.

In the marketplace, the inventors have discovered that certain applications that provide a certain set of benefits, features or functions can be valuable in the connectivity of e-business or e-marketing. With reference to the schematic of FIG. 1, a business service provider 101 may employ one or more customer relationship management (CRM) applications 102 that provide interaction between the service provider 101 and its various customers 104. On one level, such CRM applications 102 can store data that can be analyzed and used by the service provider 101 to build upon or create customer relationships or to extract greater value from its clients using B-to-C (business to customer) applications 102A.

On another level, the CRM applications 102 can be used to do business with entities such as other companies, firms or other like business clients 106 in association with B-to-B (business to business) applications 102B that are focused on the institutional needs of the business clients 106. Implementation of B-to-B applications 102B in a modern business environment, however, involves utilizing enhanced compliance components that can be applied to transactions with other business entities. For example, compliance with auditing or accounting requirements (e.g., Sarbanes-Oxley), medical records and privacy issues (e.g., HIPPA), and encryption and electronic storage of documents (e.g., e-mails), may be necessary in various B-to-B transactions. The inventors have realized that systems (like those described herein) are needed that can facilitate B-to-B business transactions, including processing client information, on an international platform across a variety of regulatory environments. For example, credit card companies need to process sensitive information such as social security numbers; lenders need to gather and process privileged information from borrowers; broker/dealers need to process CUSIP data; and public companies need to interact with and communicate with other public companies on various major transactions. Thus, it can be seen that there may be many regulatory compliance requirements of B-to-B applications 102B that may not necessarily impact execution of B-to-C applications 102A.

Referring again to FIG. 1, the service provider 101 may employ one or more partner relationship management (PRM) systems 108. The PRM systems 108 can be supply-chain oriented types of systems, for example, wherein alliances formed with the service provider 101 can be one-to-one, one-to-many, or many-to-many. The PRM systems 108 are often impacted by a problem the inventors have identified as "segregation" requirements. For example, with regard to multiple partners of the service provider 101, Partner A may be permitted to see what Partner D is doing, but Partner A may need to be linked to Partners E, F, and G, who cannot be permitted to have access to Partner D's transactions or activities. Systems are described herein that can provide the flexibility for new contracts or relationships to form between/among the partners efficiently and dynamically, with appropriate levels of permission to access various sources of information and data. Also, with respect to the PRM systems 108, each one of the partners can have the ability to choose from a series of interactions with the other partners, rather than merely a series of one-to-one interactions. For example, Partner A may decide that it wants to deal with Partner D on only four of the types of activities, products, or services provided by Partner D. Also, for example, Partner D may want to be able to deal with Partner B on just two offered products or services.

In another aspect of FIG. 1, extranets 110 take into account the B-to-C applications 102A, the B-to-B applications 102B, and the PRM systems 108, allowing relationships between/ among them to be deployed onto a networked medium such as the Internet, for example. This interaction can serve a broader universe of requirements and functions, whether arising from the needs of one or more consumers, business entities, partners, and/or combinations thereof. In various embodiments described herein, a referral system 112 may be implemented for operation and use in association with the convergence area 114 of the CRM applications 102, the PRM systems 108, and the extranets 110. This system architecture facilitates interaction between/among larger institutions and business entities, smaller business concerns, as well as individual customers, representatives, and/or agents representing particular products or services. In various embodiments, referral data and information can be processed by the referral system 112 through a portal common to various commercial entities and enterprises. The positioning of the referral system 112 within this architecture also facilitates tracking, storage, retrieval and analysis of data and other information for a variety of compliance purposes and functions, such as regulatory compliance. For example, a broker/dealer may employ many independent brokers, and the referral system 112 can be configured to allow the brokers to communicate transactions between/among themselves in an accurate, efficient and auditable manner.

It can be appreciated by those skilled in the art that embodiments of the invention described herein provide many benefits. The invention allows tracking, reporting and other processing activities associated with referral data and other information for a variety of product and service offerings. As described below, referral system embodiments of the invention can help to streamline operations and increase revenue and productivity for various business entities in many different business sectors.

Figure 2:
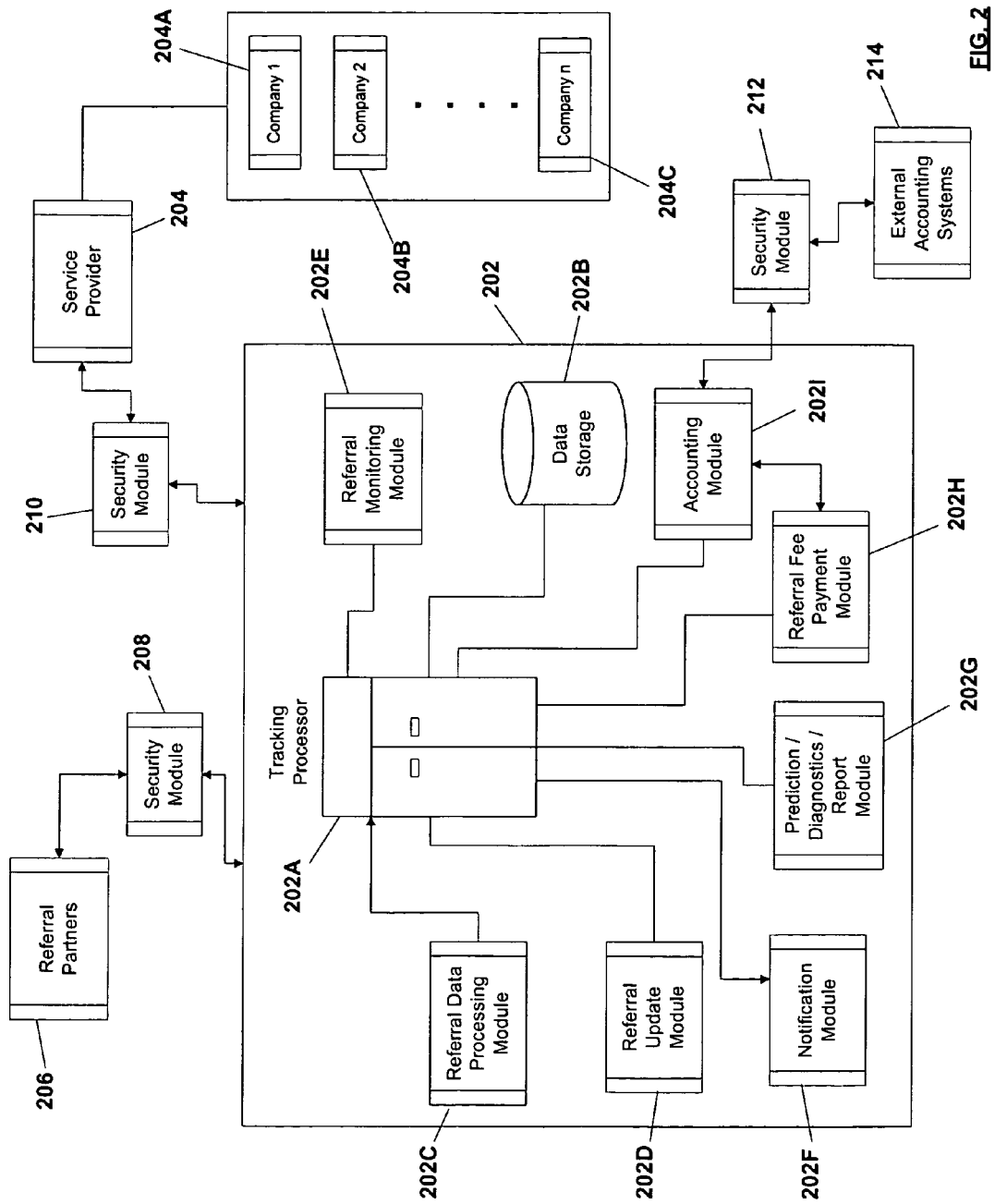
FIG. 2 includes a system architecture diagram illustrating an example of a referral system that can be provided in association with embodiments of the invention.

With reference to FIG. 2, a referral system 202 may include a tracking processor 202A, one or more data storage devices 202B, and one or more modules 202C-202H that execute various functions and applications of the referral system 202. The tracking processor 202A may be a web-based server, for example, or another suitable server or computer system. In various embodiments, the modules 202C-202H may be software programs, for example, or other applications or devices that execute programs in association with the referral system 202. The modules 202C-202H may be programmed in any of a variety of suitable programming languages, such as "JavaScript & PHP" programming language, for example. The data storage devices 202B may be embodied as one or more "MySQL" databases, for example. The referral system 202 may be maintained and operated by a business service provider 204 that offers and performs various services. Examples of services performed by the service provider 204 include, without limitation, tax services, merchant solutions (e.g., payment processing, or credit card transactions, small business finance (e.g., loan services), information technology services, client services, and/or insurance. In certain embodiments, the services performed by the service provider 204 may be executed by one or more companies 204A-204C or firms affiliated with and/or comprising the service provider 204.

In operation, the referral system 202 may employ an open SOAP standard, for example, or another system intercommunication standard to provide integration among potentially dissimilar systems maintained and operated by multiple referral partners 206. As discussed above with reference to FIG. 1, the referral system 202 can substantially seamlessly establish connectivity with multiple CRM applications 102, PRM systems 108, or extranet environments 110 or architectures.

In various embodiments, the referral system 202 can be operatively associated with one or more security modules 208, 210, 212 that create a security control wrapper or envelope for the system 202 and the various parties and systems that communicate with the system 202. This permits different entities to access the same set of referral data management tools, for example, while the scope of the information that can be viewed or manipulated in the system 202 can be limited by predefining access rights for each user. In other words, each user can have its own "bubble" of vision into the system 202, with the content of what can be viewed being dependent on the rights the user has been granted in the system 202.

In various embodiments, multiple communication interfaces can establish communication and data transmission between/among the different entities that access the referral system 202. These interfaces may include, for example, SQL server connections, HTTP requests for communications with referral partners 206, and/or SOAP communications between/among the service provider 204, the referral partners 206, or other entities.

For example, HTTP requests can allow the referral partners 206 to submit leads or referrals without needing to log directly into the referral system 202. This enables communication of business leads directly from the web sites of the referral partners 206, for example, to the system 202 without needing to direct customers of the referral partners 206 to the system 202. For example, a credit union administrator, but not a credit union member, could be the entity that logs into the system 202. It can be appreciated that this feature provides a one-way form of communication from the referral partners 206 to the system 202, without requiring the system 202 to respond directly to the customers of the referral partners 206. This simplicity of a design using HTTP requests, for example, provides a benefit in that new referral partners 206 can be readily given access to the system 202 without substantial software coding or other infrastructure changes.

In another example, the SOAP communication interface can provide a two-way communication link between the referral system 202 and the service provider 204, the companies 204A-204C, and their associated systems. This two-way communication link can permit the service provider 204 to perform updates or monitor referral data or information on the system 202 related to the services provided by the service provider 204. This interface can be configured to translate between specific terminologies of the systems of the service provider 204 and the business-oriented performance of the system 202. For example, in the insurance industry, there can be many different details involved with acquiring information necessary to sell an insurance policy. Some policies can be very intricate and involve multiple steps in their establishment. As the policy proceeds to closure, the information the system 202 reports to the referral partner 206 may not be very detailed compared to a higher level of detail of information the system 202 reports to the insurance policy service provider 204. For example, statistical rates of hurricanes for a given piece of property in a certain geographical area may be reported to the service provider 204, but not necessarily to the referral partner 206. The two-way communication interface may also permit administrators of the system 202 to manage one or more systems or sub-systems of the service provider 204.

In various embodiments, the referral system 202 can manage referrals or prospects communicated by one or more referral partners 206 to the referral system 202. As applied herein, a "referral" includes any data or information regarding a prospective business lead or business opportunity associated with one or more services offered and/or performed by the service provider 204. A "referral partner" may include, for example and without limitation, an investment bank, investment brokerage, corporation, firm, partnership, financial service provider, credit union, sales agent, sales representative, and/or employees or agents thereof which are capable of employing embodiments of the invention to communicate referral data and information to the system 202, for their own business operations and/or for the business activities of their various clients and customers. The referral system 202 can be configured to track the progress of referrals and promote timely updates of leads submitted by the referral partners and/or employees of the service provider 204. In addition, the referral system 202 can provide financial and performance reporting based on referral data and other information collected and stored in the system 202. It can be seen that the referral system 202 may be accessed by the referral partners 206 through an application service provider (ASP) model or system architecture, for example.

In various embodiments, referrals communicated to the referral system 202 may contain, for example and without limitation, one or more of the following data regarding a lead or other business opportunity: user identity of a referral partner 206; service of the service provider 204 being referred; date referred; user identification for primary assigned user; user identification for secondary assigned user; user identification for tertiary assigned user; referring company name; referring company address and/or other contact information (e.g., phone, fax, e-mail, URL address, contact names, and the like). In various embodiments, referral data can be received and stored by a referral data processing module 202C of the referral system 202.

The data storage 202B may include a centralized database that can be segmented or segregated for use by different referral partners 206. For example, an investment bank referral partner 206 has various regulatory requirements it needs to meet, so it may want to use the system 202 for compliance reasons. The investment bank may also use the database 202B for other types of marketing programs, for example, not necessarily affiliated with referrals submitted to the system 202. In either situation, the database 202B provides the referral partner 206 with connectivity and the ability to access only its customers. Thus, the database 202B can be segregated and segmented in such a way that an investment bank has different access than a credit union, for example, and each entity can use data in the database 202B for various purposes. The system 202 can be designed to promote compliance with various laws, regulations, policies, and rules, such as requirements arising from broker-dealer transactions; SEC; NASD; SBA; Patriot Act; Farm Credit Administration; Gramm-Leach-Bliley Act; auditing or accounting requirements (e.g., Sarbanes-Oxley); medical records and privacy issues (e.g., HIPPA); encryption and electronic storage of documents (e.g., e-mails); credit card transactions; privacy issues (e.g., communication of social security numbers); communications involving borrower/lender information; transactions involving CUSIP data; and/or, many other types of transactions, communications, or other regulatory, legal or governmental requirements.

The referral system 202 can be utilized by employees of the service provider 204, as well as by any of the referral partners 206, thereby developing mutually beneficial relationships with the referral partners 206. In operation, the referral partners 206 can log into the referral system 202 and submit referrals for various services offered and/or performed by the service provider 204. The referral system 202 can be configured to require users to login before using the system 202 with a user name and password. In addition, the following information can be stored in the system 202 for its various users: user ID; password; first name; last name; e-mail address; company name; access level; manager ID (if the user is a manager); phone data; and/or, address or other contact information (e.g., city, state, ZIP).

One or more agents or users assigned by the service provider 204 to receive and process referrals can update the status of the referrals with subsequent communications or significant milestones that occur as the referrals progress. Referral status can be reported to a supervisor or director of the service provider 204, or the appropriate company affiliated with the service provider 204. In addition, sales agents of the referral partners 206, for example, can report the status of their referrals to their office managers or other appropriate supervisory personnel. Status on referrals can be updated on a suitable periodic or non-periodic basis (e.g., daily, weekly, or other).

It can be seen that use of the referral system 202 allows the referral partners 206 to monitor the status of how their clients are being handled by the service provider 204 in real time throughout the sales and service provision process. With each correspondence that agents or personnel of the service provider 204 have with potential clients, updates can be added to the system 202 through a referral update module 202D, for example. In addition, status of in-process referrals can be monitored through a referral monitoring module 202E, for example, operatively associated with the referral system 202. Updates and other notations applied to a given referral can be accessed through the referral system 202 to allow development of workflow lists and task management to be conducted by both the service provider 204 and the referral partners 206.

Referrals can be updated as processed by personnel of the service provider 204. The referral updates may contain the following information, for example and without limitation: status code; date of status update; updating user; notes on the update; and/or, requested loan amount (if a loan referral). In certain embodiments, updates for a referral can be stored and displayed in chronological order. Each status update may include a predefined status code which can be configurable and service-dependent, and each service may have its own set of status codes that describes its work flow. For example, for reporting purposes, status codes may be grouped into different categories: "open"—deals that are active in the system 202; "suspended"; "inquiries"; "closed"—deals that have been successfully completed; "closed and compensated"—deals that have been successfully completed and have had referral compensation paid; "dead"—deals that have been determined to be non-progressive.

In various embodiments, the referral system 202 may also include a notification module 202F that can be configured to alert employees (e.g., by e-mail) of the service provider 204 when new referrals or opportunities are communicated to the system 204. The notification module 202F may also be configured to notify the appropriate personnel when existing referrals are not updated within a predetermined time frame, for example. The notification module 202F may also be configured to communicate a notification if a change in status code is detected for one or more submitted referrals.

The referral system 202 maintains a built-in hierarchal structure that can be customized for any organization, firm or other business entity. By use of the monitoring module 202E, for example, managers or other supervisory personnel can effectively monitor employee work flow by overseeing referral processing. Also, a prediction/diagnostics/report module 202G can be provided that allows development and generation of various reports that summarize and present referral data. The reports may be customized, standardized, and/or query-based, depending on the needs of the user. In various embodiments, the referral system 202 can also be used to forecast revenue by monitoring referral conversion rates and time frames as referrals move closer to final sale or completion.

In various embodiments, the referral system 202 provides ways to measure, summarize, and/or report at least the following data: sales and marketing proficiency of personnel; efficiency of processing personnel; time of each transaction worked on; number of each transaction at any point; batting average of processing personnel of the service provider 204; and/or, batting average of each referral partner 206. Many metrics can be generated and presented as customized or standardized reports through use of the prediction/diagnostics/report module 202G. It can be appreciated that metrics monitored and stored by the system 202 can be used to identify trends or patterns in referrals such as bottlenecks and disparities between/among different deal scenarios, such as why certain types of deals perform well compared to other types of deals. For example, an investment firm may have a number of sales specialists, representing a larger number of financial managers who, in turn, represent thousands of financial advisers or brokers in the firm. The sales specialists may deal individually with the financial managers in a given territory, and the financial managers may deal with the financial advisers in a given territory. With diagnostic tools provided by the invention, the sales specialists can see referral data and performance data on their associated financial managers. Likewise, the financial managers can see similar data for all of their associated financial advisers. The data can be viewed and manipulated by geography, by time, type of service, and/or many other variables.

For example, a "referral aging report" may function to provide performance feedback regarding percentage and quantity of referrals; percentage and quantity of dollars (e.g., with respect to loan referrals); and/or process time of business referrals (e.g., in terms of how they behave between stages of business processes). For example, the referral aging report may allow for differentiation and grouping of deals or referrals by one or more of the following factors: deal handler (e.g., FC, underwriter, closer); referral partner 206 handling the deal; loan size range; date range of submission into the referral system 202; date range of process flow; referral partner 206 source; particular user source; state of origin; and/or, state of referral within a certain date.

The referral aging report allows for the definition of status code as a "determination point" and anything not up to that stage in the business process can be considered to be undetermined and may not be factored into the results of certain calculations. For example, determining how many deals were approved by underwriting would involve calculating the number of deals that moved from a "begin underwriting" stage to an "underwriting approved" stage, by using a "finished underwriting" stage as the determination point. For example, deals still in "mid-underwriting" stage, and not yet applicable to determination, could be excluded from this statistical calculation. The referral system 202 can calculate the number of deals that entered underwriting and were approved, as a percentage of the total number of deals that entered and finished underwriting. A similar formula may be used to track dollars moving through the "pipeline" of the system 202, such as in the case of loan processing, for example. The only difference being that unlike the static nature of referrals in and of themselves, the dollar worth of a deal can change value as the referral proceeds through the pipeline. Outliers may be removed from calculations using standard deviation techniques for process time values, and other results can be clarified using standard deviation elimination techniques and/or other statistical techniques.

When a submitted referral successfully closes, the submitting user can be notified through the notification module 202F, and a referral fee associated with closure of the referral can be paid to the referring referral partner 206 through the referral fee payment module 202H of the referral system 202. In various embodiments, referral fees may be paid as a flat fee, a fixed or variable percentage of the value of the service provided (e.g., a percentage of a loan amount), and/or on any other basis for such fees as known to those skilled in the art.

In various embodiments, the referral system 202 may include an accounting module 202I, which can be provided as an accounting general ledger, for example, configured for recordation of data associated with payment of referral fees. The accounting module 202I may also be operatively associated with one or more external accounting systems 214 to allow the system 202 to provide direct output into the general ledger of various service providers 204 and/or referral partners 206. This allows interconnectivity between the system 202 and the accounting software or systems of the service provider 204, the companies 204A-204C, and/or the referral partners 206. This may permit entities external to the system 202 to eliminate or reduce their own accounting systems and processes. Referral fees, for example, can be directly applied to the general ledgers of the referral partners 206 and/or accounts of particular agents employed by the referral partners 206.

In operation of certain embodiments, after a referral is closed or completed by the service provider 204, an invoice can be generated and a referral fee calculated based on the contract provisions. The invoice may be automatically generated in a printable format ready for transmission to accounting. An accounting department of the service provider 204 can then send a check or perform a wire transfer, for example, to remit payment to the appropriate recipient, and this can be done either manually or automatically. Once the payment is remitted, the accounting department can notify the system 202 via automatic intersystem communication link or referral compensation interface that the referral payment has been made. For example, the following information can be stored in the system 202 regarding such payments: referral partner 206 being compensated; referral being compensated for; calculation being used to determine payment amount (e.g., based on contract with referral partner 206); which user issued the payment; and/or, when the payment was remitted, among other pertinent data.

It can be appreciated that the referral system 202 can be used to form relationships with additional referral partners 206. For example, if an existing referral partner 206 establishes a relationship with a newly discovered organization or business entity that can benefit from offering one or more services of the service provider 204, the new organization can be referred to the service provider 204. Once the existing referral partner 206 notifies the service provider 204 of the new organization, an account can be established for the new organization to permit it to submit and view referrals. In certain embodiments, the existing referral partner 206 may be permitted to have access to view referrals made by the new organization to the service provider 204.

The system 202 may also employ a system of user privileges and permissions that promote data security and integrity among different users of the system 202. User rights or permissions in the referral system 202 can be implemented in a user tree structure, for example. There may be multiple levels of user permissions that govern what a given user can revise with regard to a given referral, such as: "view"—dependent on the submitter of the referral; or, "update and edit"—determined by the user or users to whom the referral is assigned. Thus, referral permissions can be determined in terms of a particular user. In certain embodiments, identical access may be granted to all users who are in the same management tree, and access may be granted to a referral because of the user level and/or company 204A-204C of the service provider 204 to which the user is assigned. In various embodiments, users can be inserted into a manager's management tree by, for example: designating the manager as the user's manager in the edit user tool; being the manager of a user; or, having a user level and/or company assignment that designates a user as being managed by them. Permission access levels can be assigned as follows, for example: Level 1—program administrator; Level 2—executive; Level 3—brand manager/national sales manager; Level 4—sales manager/office manager/company president; Level 5—sales person/packager; Level 6—web site referral. In addition, executives of a company 204A-204C of the service provider 204 may be permitted to see referrals that were submitted to that company for a given service or services. In addition, there may be different assignment relationships possible between a user and a given referral, such as primary, secondary, tertiary, etc., for example.

In various embodiments, activity and transactions conducted on the referral system 202 can be logged and recorded for future use, analysis, and/or auditing. This creates an audit trail that promotes the credibility and integrity of updates. In addition, the system 202 can be configured to never delete referral data or information from the system 202. Referrals can be tagged for non-display at a certain point, but all data and information relating to the referral can be kept intact. For example, the following information may be logged and retained in the system 202 for referrals: updates of referrals; assignments of referrals to users including: who performed the assignment, who it was assigned from, who it was assigned to, when it was assigned; and/or viewing of pages including what page was viewed and who viewed it.

Figure 3:
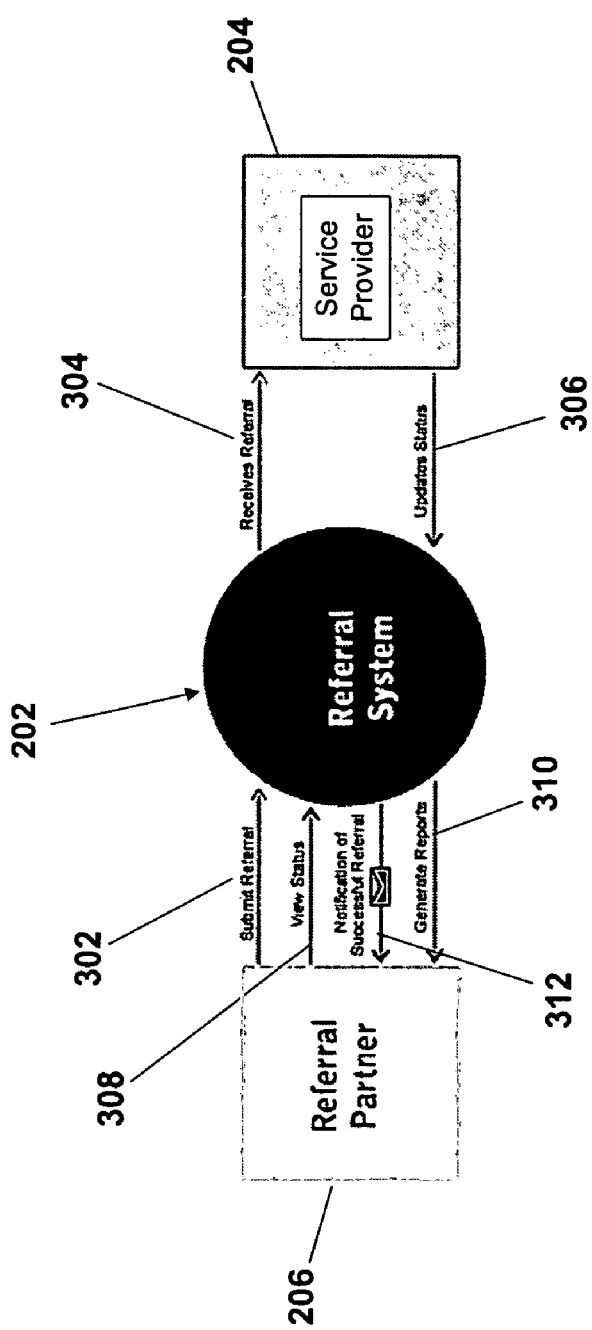
FIG. 3 includes a process flow diagram illustrating various examples of process steps that can be performed in association with a referral system structured in accordance with embodiments of the invention; and, FIGS. 4 through 31 illustrate screen displays that provide examples of various functions and tools associated with various referral system embodiments of the invention.

FIG. 3 illustrates an example of a process flow provided in accordance with embodiments of the invention. At step 302, the referral partner 206 submits or communicates a referral to the referral system 202. At step 304, the service provider 204 receives or retrieves the referral data or information from the referral system 202. As processing of the referral begins and as progress on the referral is made, such as through the efforts of personnel of the service provider 204, for example, status of the referral can be updated or revised at step 306. In addition, the referral partner 206 can view status of the referral as it progresses at step 308 and/or generate various reports associated with one or more referrals at step 310. At step 312, once a sale or provision of services associated with a referral is finalized, notification of the successful referral can be communicated to the referral partner 206.

The following screen displays are intended to illustrate examples of the operation of certain referral system 202 embodiments of the invention. No particular aspect or aspects of these exemplary screen displays is/are necessarily intended to limit the scope of the invention.

Figure 4:
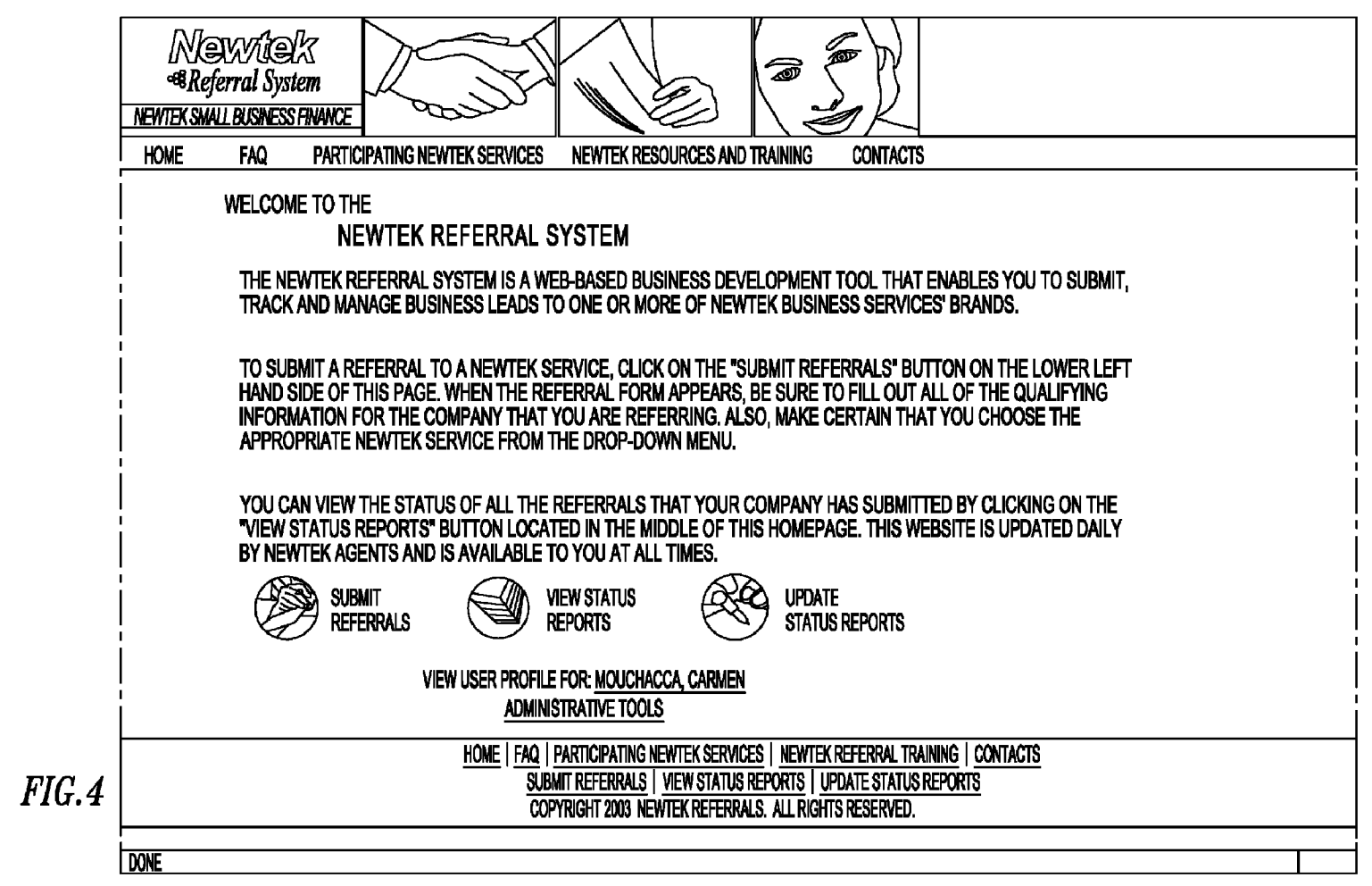

With reference to FIG. 4, a login screen can be displayed to a user to permit the user to login, to select a "submit referrals" option, to select a "view status reports" option, and/or to select an "update status reports" option.

As shown in FIG. 5, a "submit referral" screen allows the user to submit a referral to the service provider 204 and/or one of its affiliate companies. The information provided on this screen regarding the referral and the business of the user provides personnel of the service provider 204 with background and knowledge of the referral. While most fields on the screen may be used when submitting referrals to all companies of the service provider 204, certain fields (e.g., loan-related fields) may only be applicable for specific companies 204A-204C and/or services. By selecting a desired service from the services menu, the user can promote routing of the referral to the correct company 204A-204C. For example, the following information can be requested when submitting a referral: company; contact; business type; address; phone; fax; e-mail; URL; loan amount (if applicable); refer to company; loan purpose (if applicable); and/or, notes. The "notes" section on the screen can also be used to communicate pertinent information regarding the referral not addressed in other fields.

When the user submits the referral, management of the service provider 204 can be alerted with an e-mail notification, for example, that provides the following information: name of business being referred; user that has submitted the referral; company that has submitted the referral; and/or other information. In addition, one or more links can be embedded in the notification, such as a link to the referral data (i.e., a referral summary), and/or a link allowing a manager to edit the referral data (i.e., an edit referral view).

With reference to FIG. 6, an "update status reports/view status reports" screen can be accessed by users of the referral system 202. A user may view the status of submitted referrals and all appended notes. In general, status reports are running records of activities and progress associated with submitted referrals. As noted above, different users may have different viewing access permissions for certain status reports. These permissions may be dependent on the supervisory or managerial status of the user. For example, a manager may have access to the status reports of his/her employees. As shown, the user can re-sort the referral list by clicking on a column heading to designate the data in the column as the sort criteria.

When the user selects the "update status reports" function, the following information may be presented to the user: summary of referrals assigned to the user in table form; summary of referrals assigned to employees of the user, if any, in table form; links to referrals assigned to the user and his/her employees (blank for non-managers); and/or, referrals assigned to the user that are currently open (table format). The summary of referrals may include, for example: date, company, contact, referred to, assigned to, status code, loan amount, additional notes, estimated date to close, submitted by, submitted by company, and application ID.

Figure 7A:
Figure 7B:

With reference to FIG. 7, a "referral view" screen can be displayed to the user. The referral view screen can be accessed by clicking on a referral link provided in the system 202. As shown, the referral view screen can include contact information and a history of status updates associated with the referral. Users with proper permissions may also assign referrals to users in their assignment trees.

Figure 8:
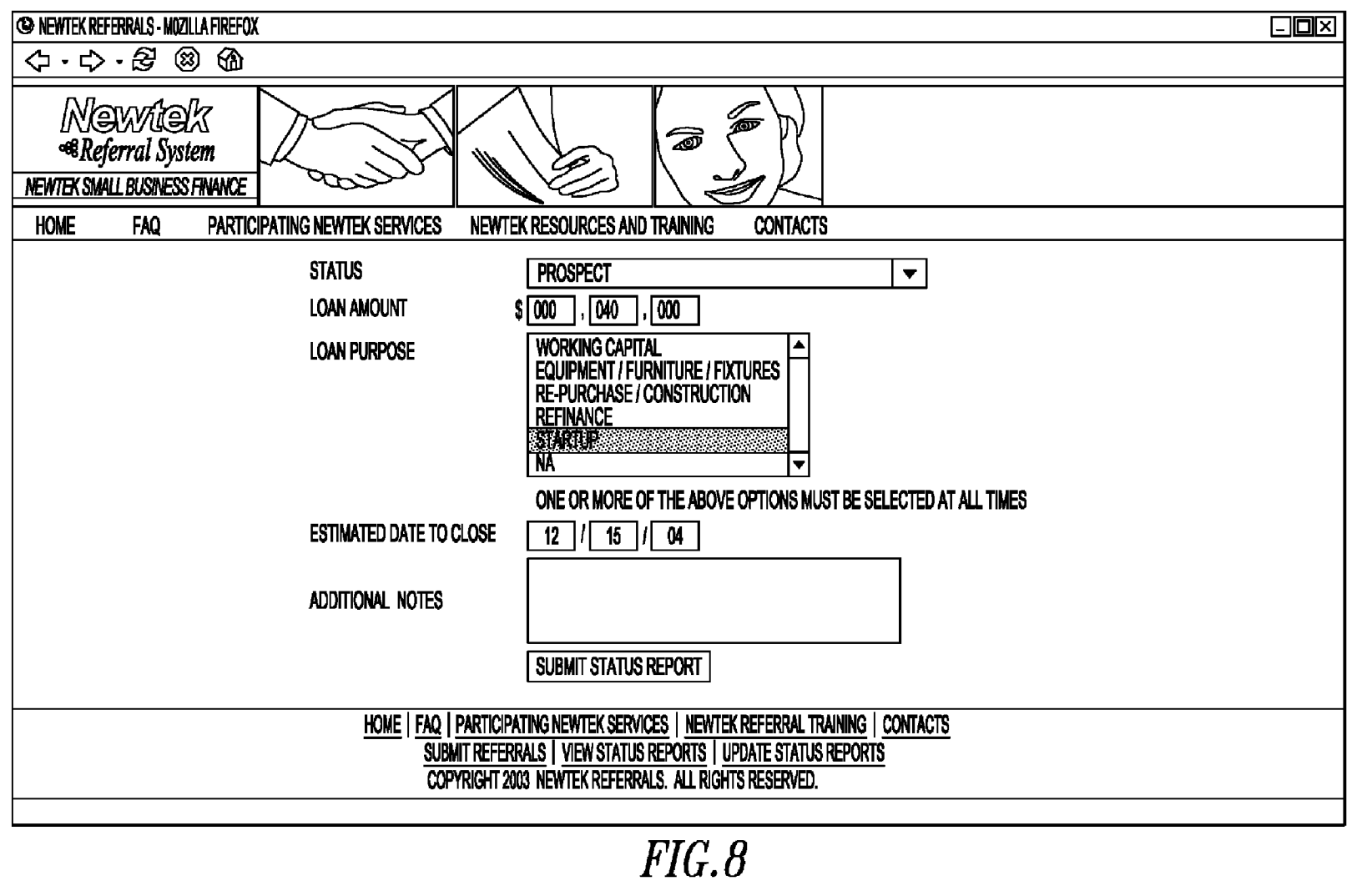

With reference to FIG. 8, the user can access an "update status" screen in the referral system 202. On this screen, the user can choose to update referral information, such as a status update. The user can also select an appropriate status code on this screen to reflect the current progress of a referral.

If applicable, the user may also adjust the estimated closing date, adjust loan amounts, adjust loan purposes, and/or add general notes on the status update.

Figure 9A:
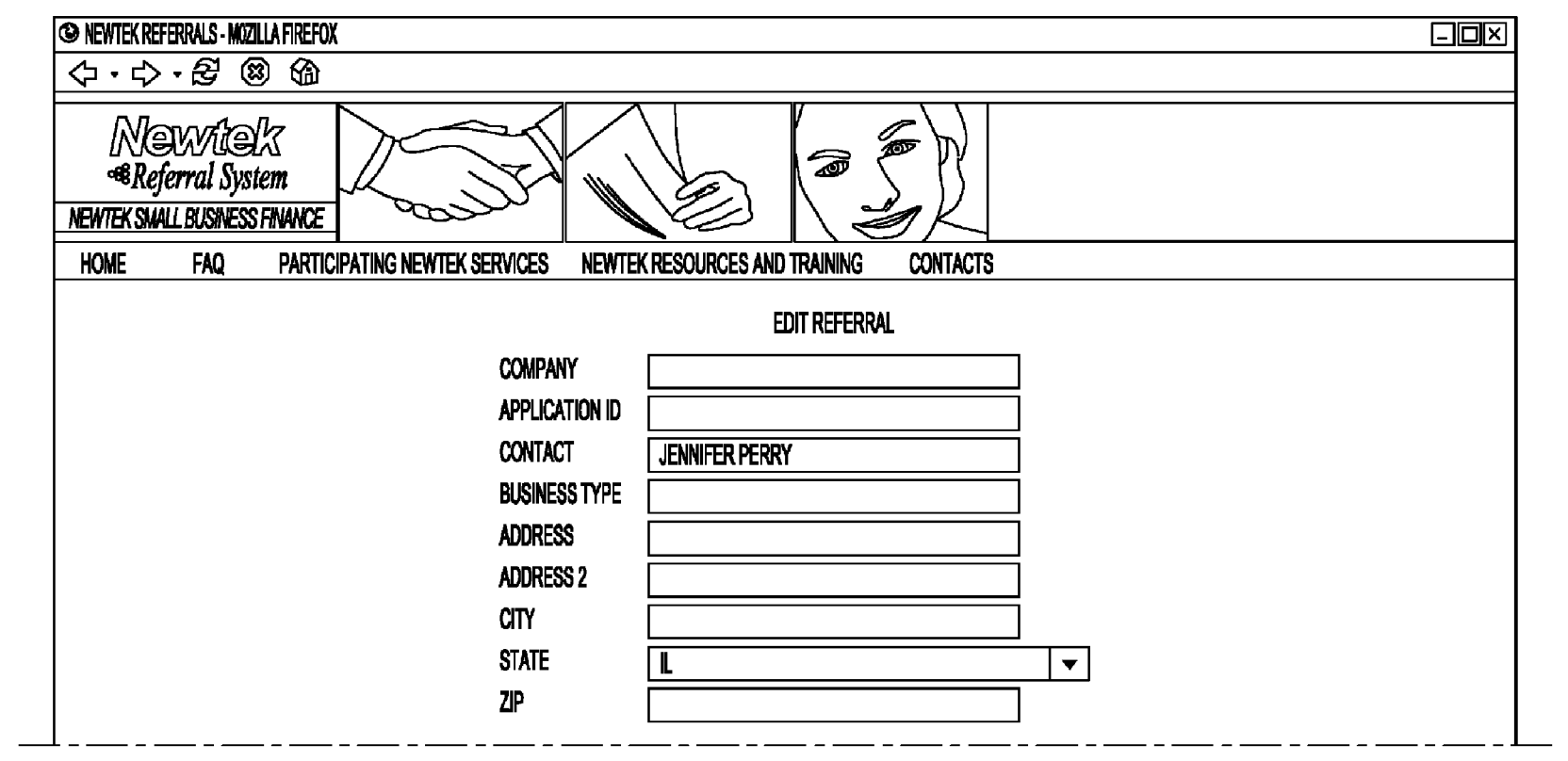

As shown in FIG. 9, the user can access an "edit referrals" page where, with proper permissions, the user can edit various referral data by clicking on the edit referral link.

Figure 10A:
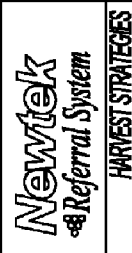

With reference to FIG. 10, a "view user" screen can display information about a user stored in the referral system 202. This screen can be accessed by clicking on a link associated with a user's name displayed by the system 202. In this screen, a user can view open referrals assigned, closed referrals assigned, dead referrals assigned, open referrals submitted, among other information. From this screen, user information can be edited by clicking on an "edit user" link (see "edit user" tool), and the login history of users can also be accessed (see "log history view" screen).

Figure 11B:
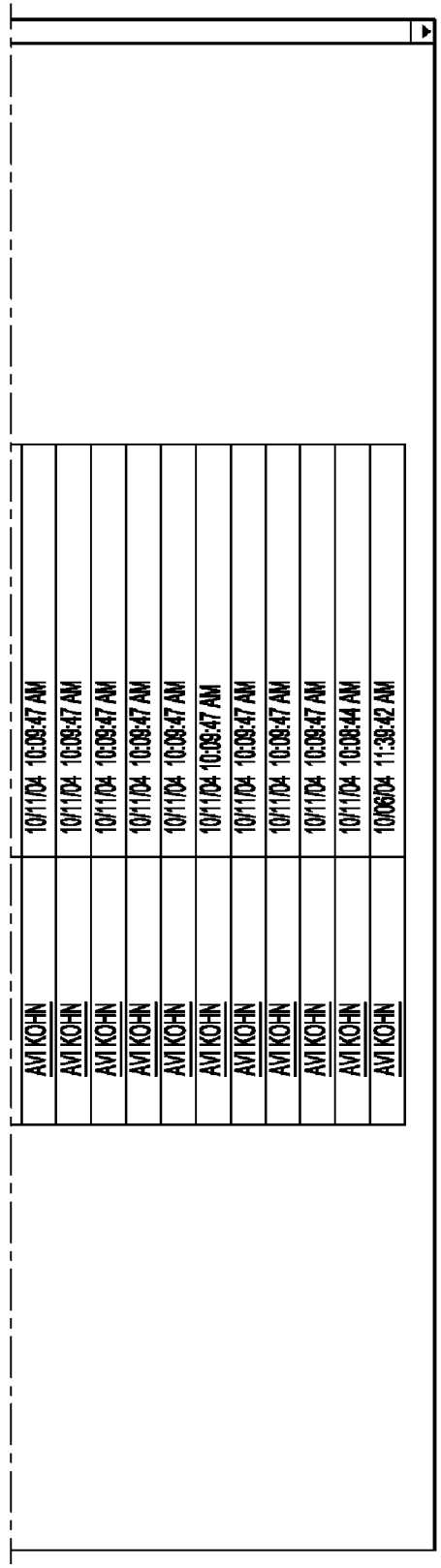

With reference to FIG. 11, a "log history view" screen permits a user to view the history of times that various users logged into the referral system 202. As shown, information displayed can include user name, time of login, and number of logins.

Figure 12A:
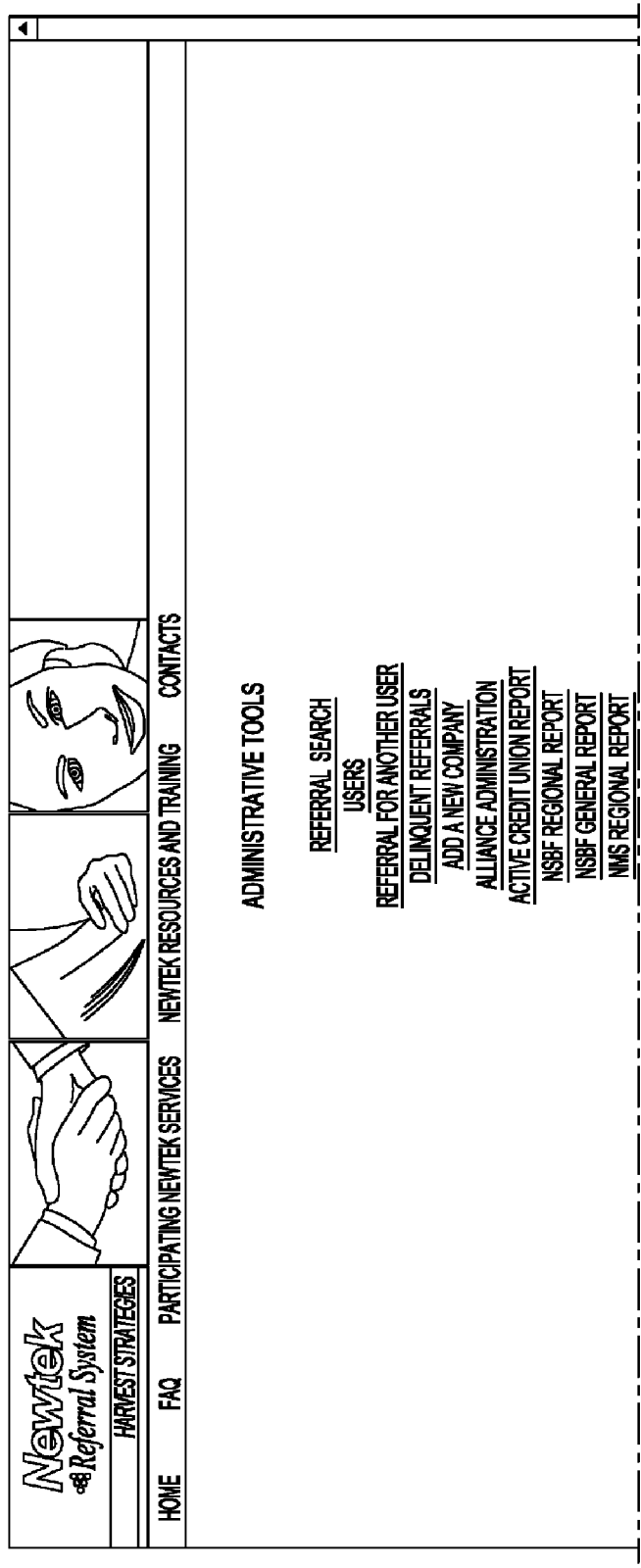
Figure 12B:
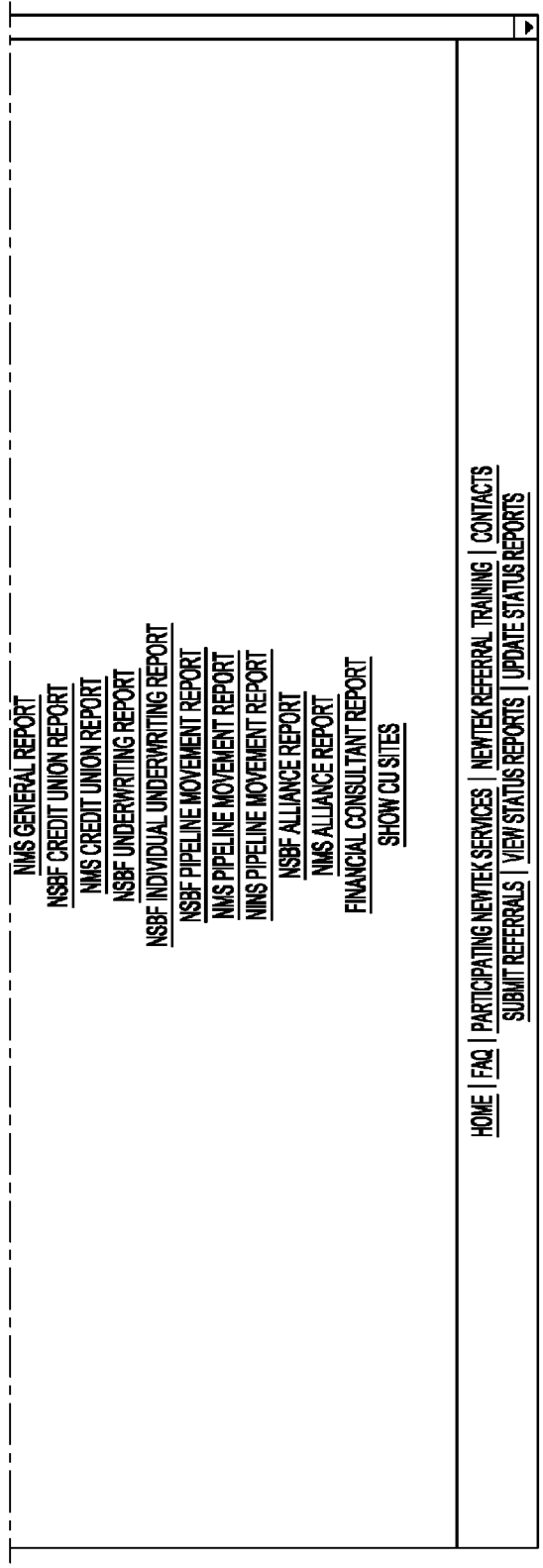

As shown in FIG. 12, various reports and tools may be accessed by various users on a "control panel" screen of the referral system 202.

Figure 13:
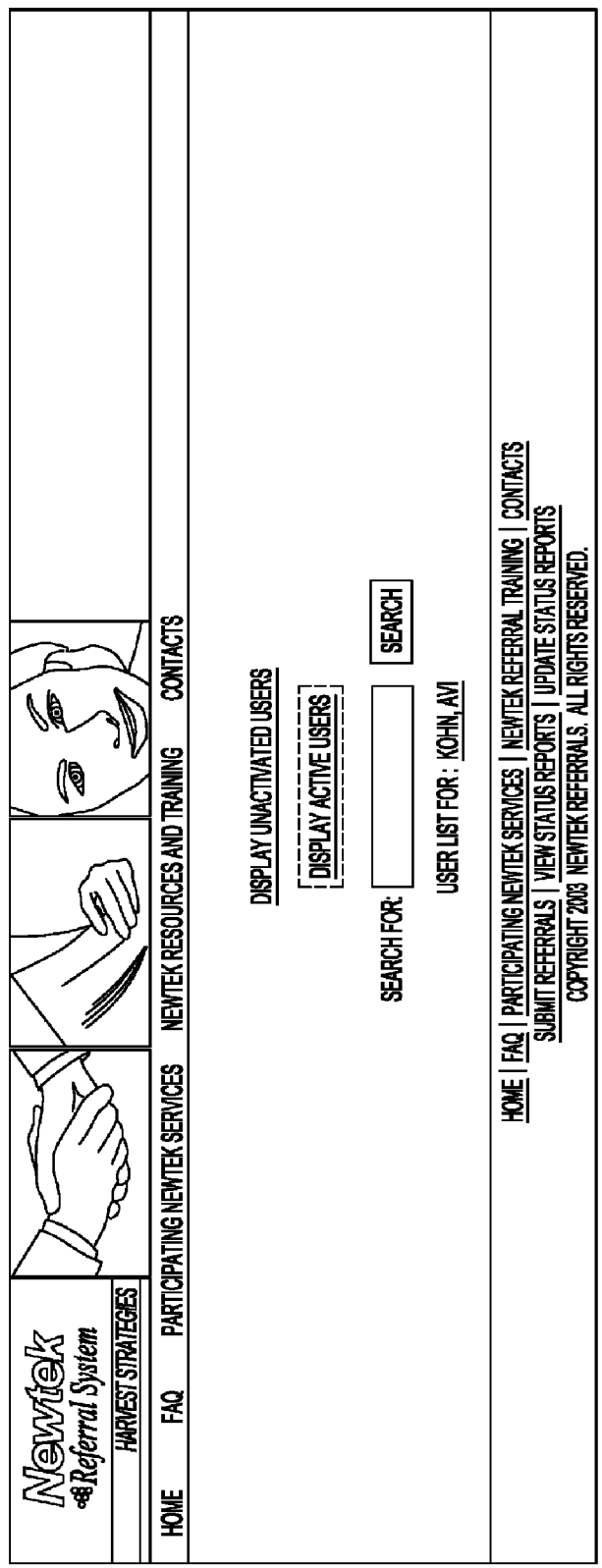

With reference to FIG. 13, a "user search" screen facilitates searches by managers, for example, to search for a particular user or browse their assigned or designated list of users. This screen also allows a manager to specify criteria of "active" or "inactive" to find users who may no longer have access to the referral system 202.

Figure 14:
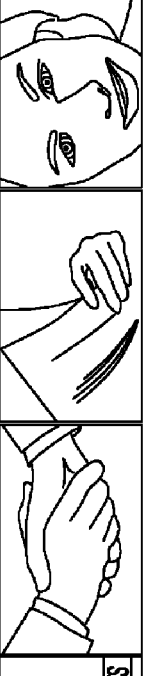
Figure 15A:
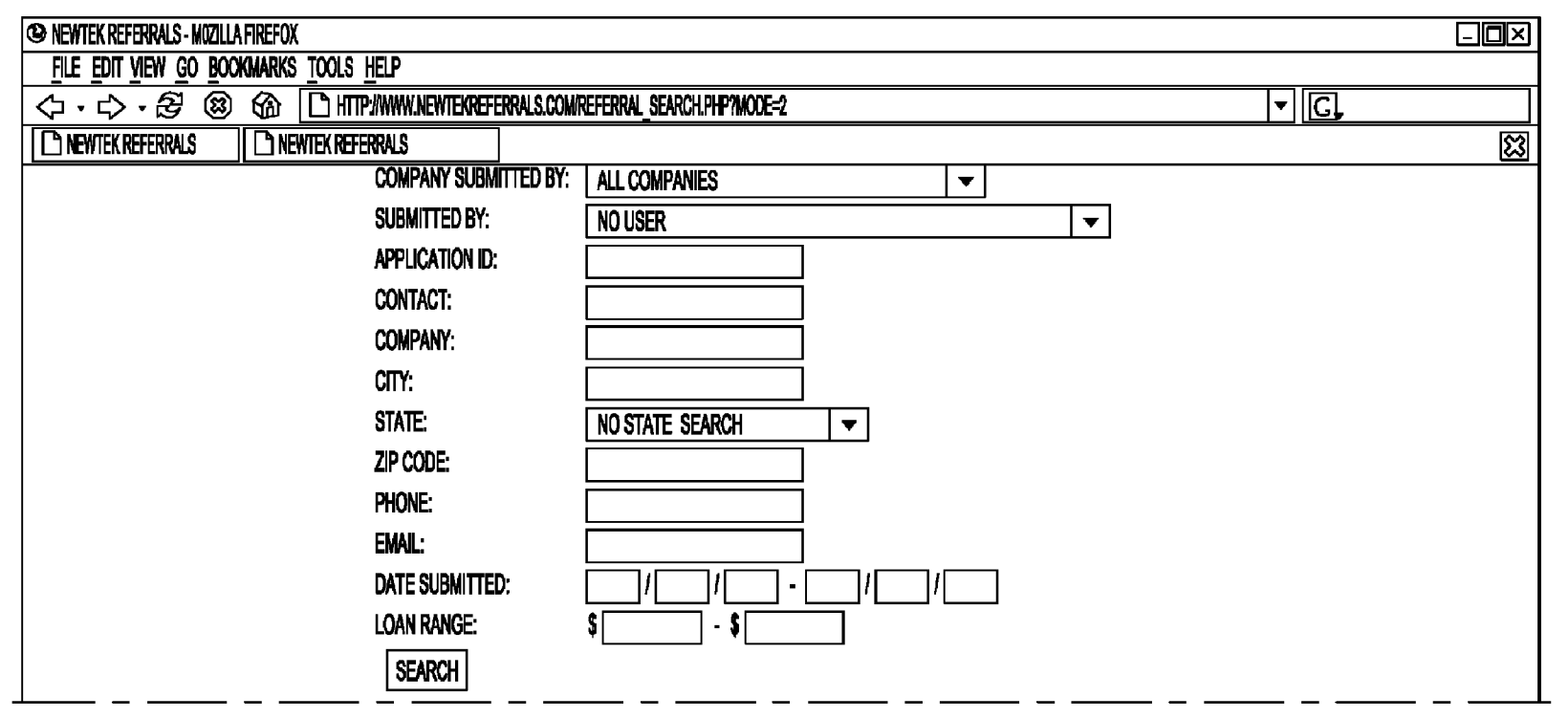

With reference to FIG. 14, a "referral search" screen, which can be accessed from among the reports and tools listed on the control panel, may be used to locate referrals previously entered into the referral system 202. As shown, a referral search can be performed by using one or more of the following fields, for example: "Referral For"—service provider 204 company to which referral is being subitted; "Status"—status code of the referral; "Company Submitted By"—referral partner 206 or other company that submitted the referral; "Application ID"—referrals for small business finance services; "Contact"—contact associated with the referral; "Company"—company being referred to the service provider 204 for services; "City"; "State"; "ZIP Code"; "Phone"; "E-mail"—the e-mail address of the contact; "Date Submitted"; and/or, "Loan Range"—loan dollar amount range. After entering the desired fields, the user can select "Search" to initiate the search. The system 202 applies the selected search criteria to find referrals stored in the system 202 that match the criteria. The search results can be displayed to the user in a table format, for example, as shown in FIG. 15.

Figure 16:

As illustrated in FIG. 16, an "add company" screen provides a tool for adding companies to the referral system 202 for assigning users to the companies. As shown, this screen allows an administrator or other user to choose the services for which users associated with the company can submit referrals. Permissions can be granted by checking the appropriate boxes. This screen can be accessed from the control panel of the system 202.

Figure 18:

With reference to FIG. 17, a user can edit company information on an "alliance information" screen display of the referral system 202. The screen display of FIG. 17 illustrates an alphabetized list of companies currently stored in the system 202. Clicking on a company name displays an edit view for the selected company, as shown in FIG. 18. Options may be edited as described in the "add company" tool.

Figure 19A:
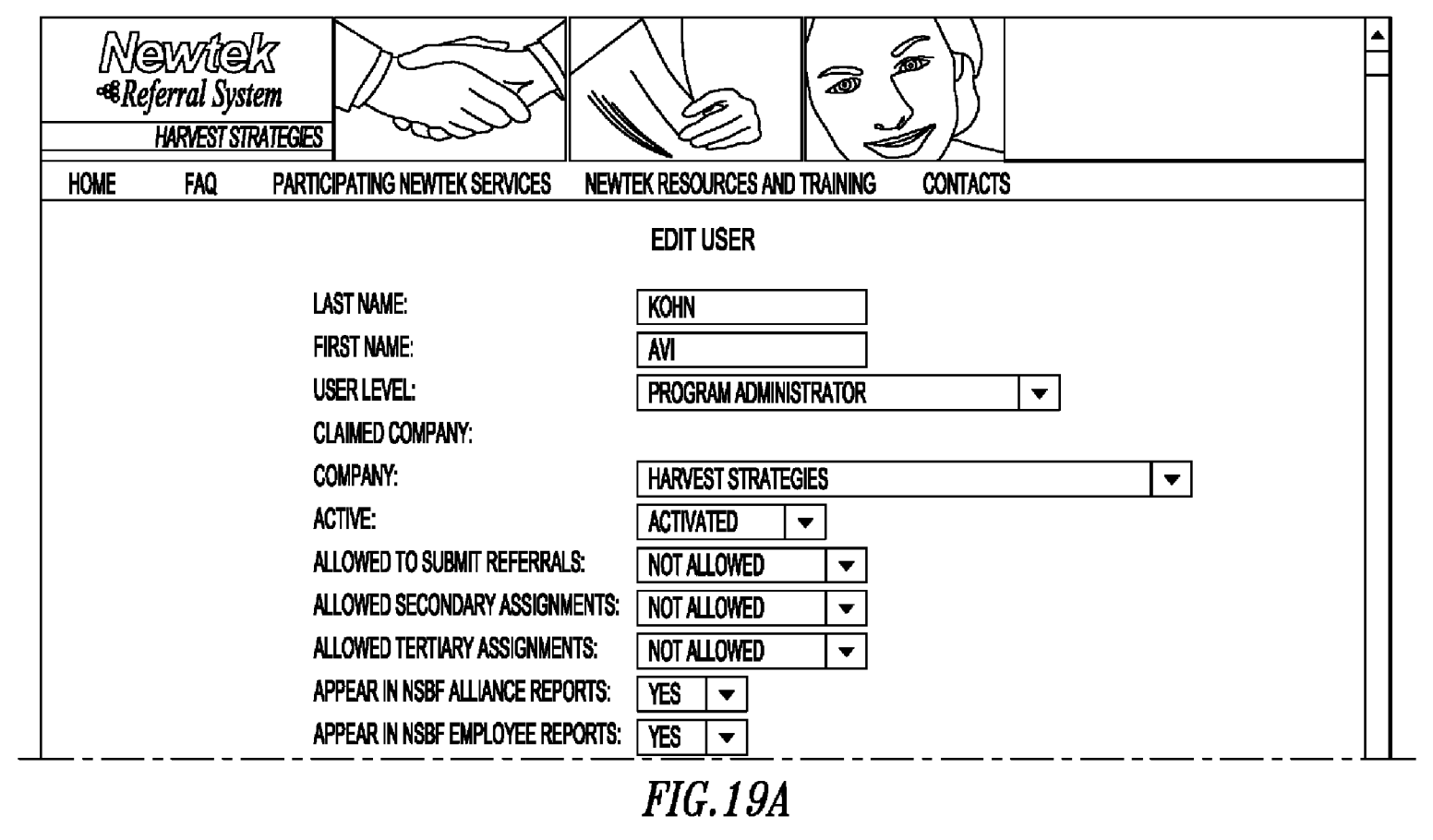

With reference to FIG. 19, an "edit user" screen permits users with the proper access rights to edit information for various users of the referral system 202. For system administrators, for example, such rights may include specifying user level, manager, which reports the user appears in, permission to receive secondary assignments, permission to receive tertiary assignments, activation status, and/or, company assigned to.

Figure 21A:
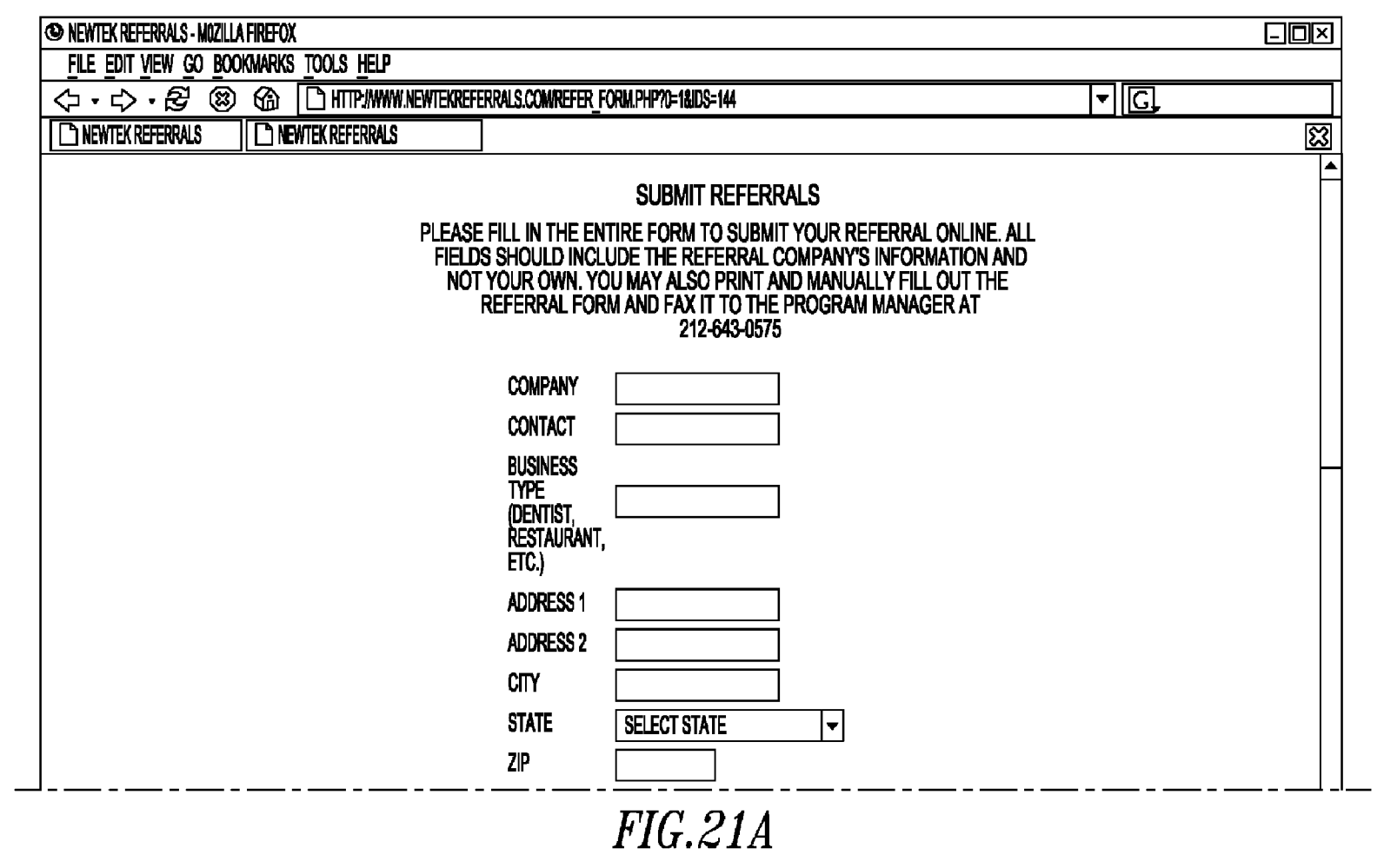
Figure 21B:
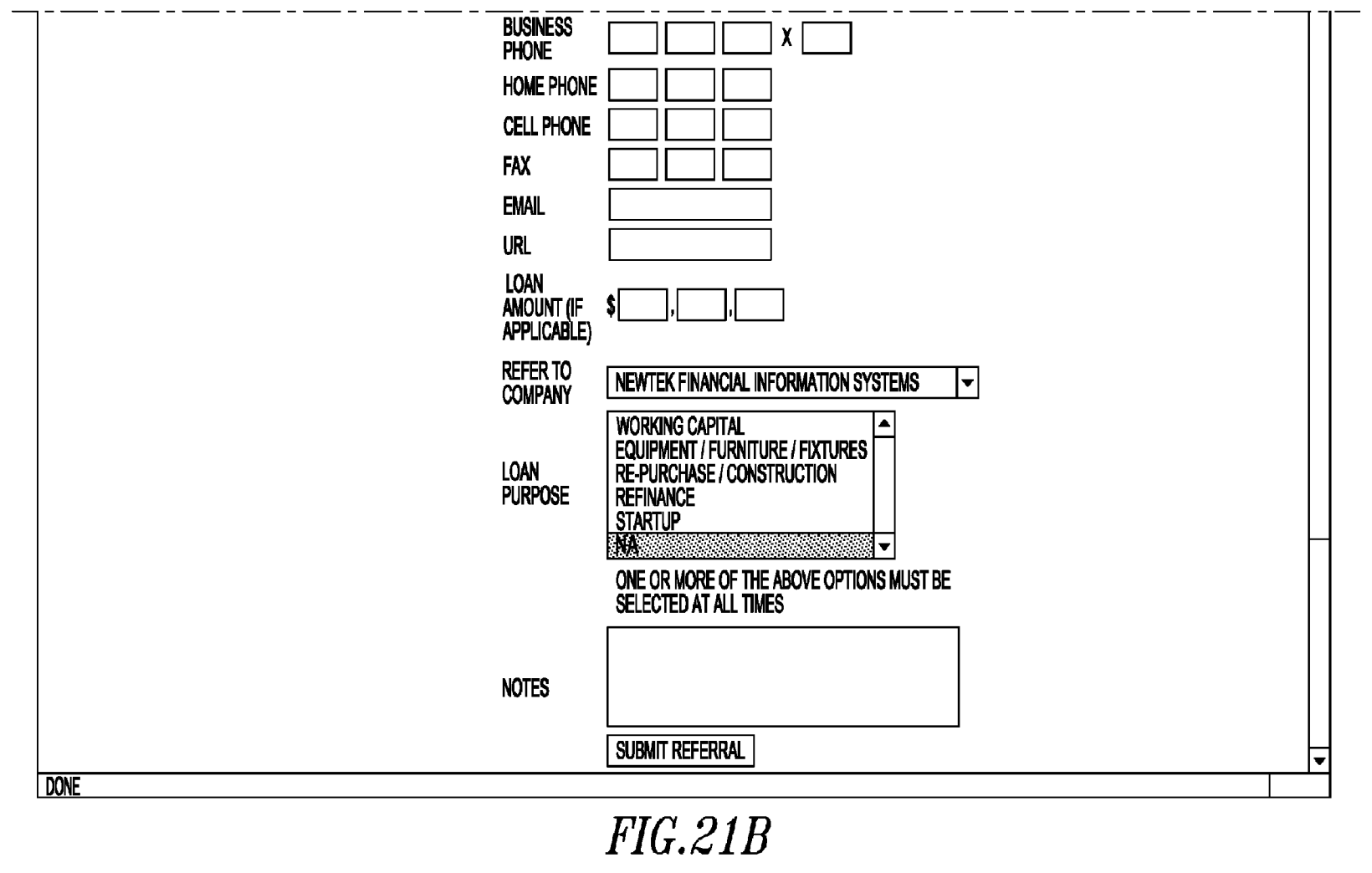

Referring to FIG. 20, a "referral for another user" screen permits a manager, for example, or other supervisory user to submit a referral and have it attributed to another user. First, the supervisory user clicks on the "referral for another user" function in the control panel. Next, a user search screen is displayed as illustrated in FIG. 20 to allow the supervisory user to enter search criteria for finding the desired user. The search results display a list of user names that can be accessed by clicking on the link associated with the desired user name. As shown in FIG. 21, a submit referral form can then be displayed to the supervisory user, who may then enter the appropriate referral information and click submit.

Figure 22A:
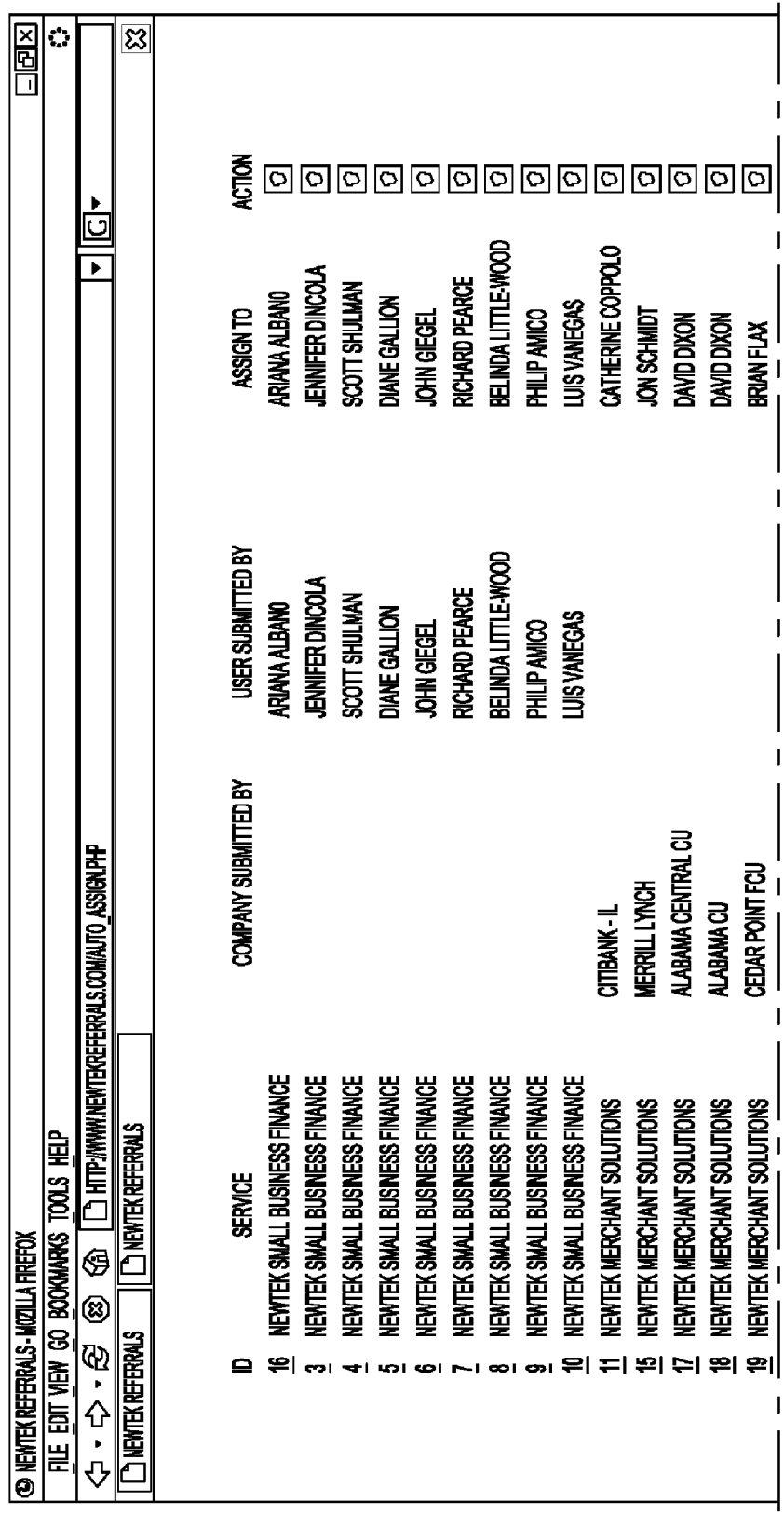
Figure 23A:
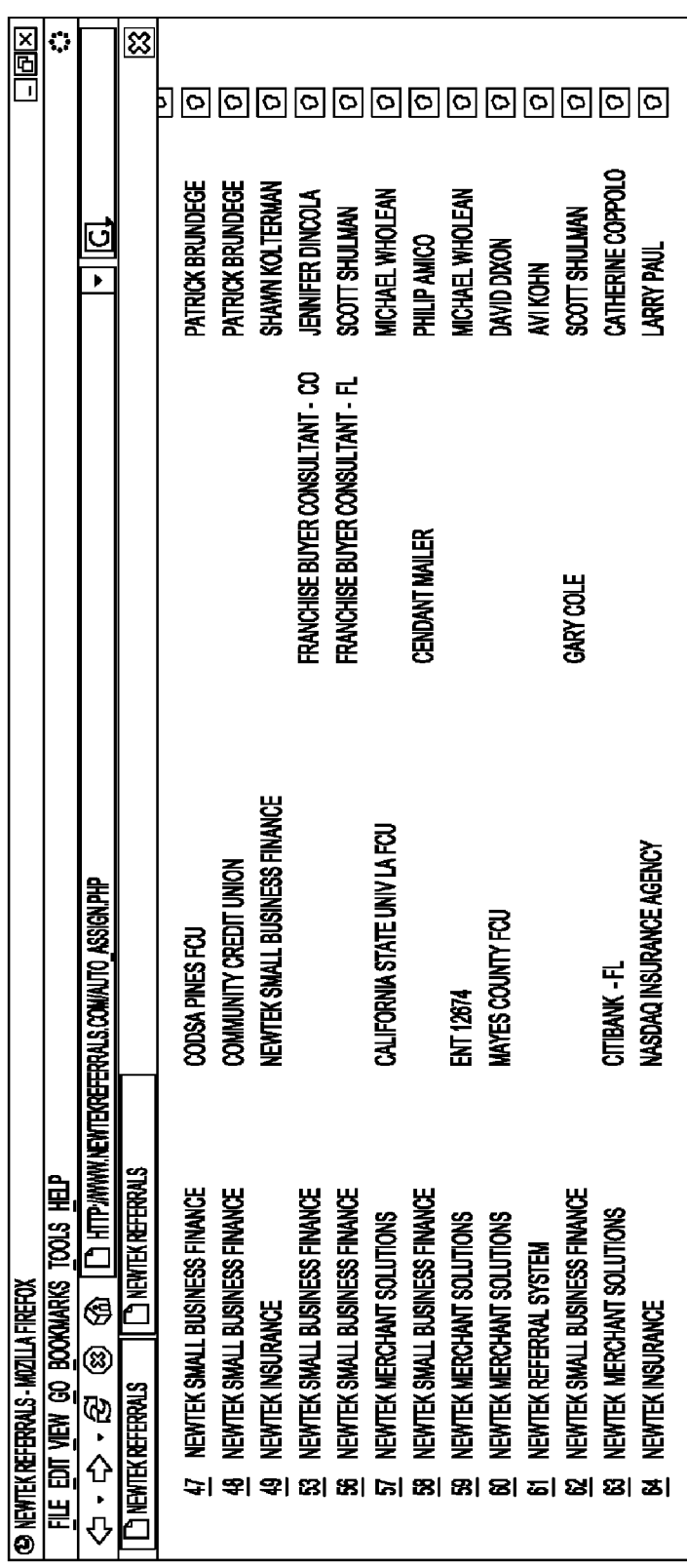
Figure 23B:
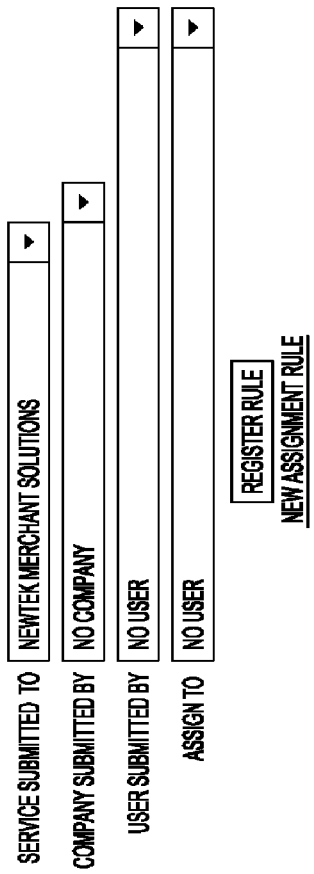

In many situations, referrals can be assigned by a program administration manager either directly to an employee of the service provider 204 or to a manager who, in turn, assigns the referral to the appropriate employee. If an employee is preselected for exclusive assignment of referrals from a particular submitter or company, the submitted referrals can be automatically assigned the employee without first being routed to the program administration manager. Such employees may nonetheless still receive e-mail notifications in the same way that they would have if the referral had been directly assigned from the program administration manager. With reference to FIG. 22, an "auto assignment configuration" tool displays a list of automatic assignments, including variables such as referring company, referring user, and service referred to. The screen display of FIG. 23 illustrates that auto assignment rules can be registered or modified by selecting the appropriate criteria and then clicking the "register rule" function. To edit a registered auto assignment, the user can click on the number next to the rule displayed on the list (see FIG. 22) and information associated with the rule can be displayed in one or more edit boxes.

In various embodiments, the auto assignment capability of the referral system 202 can be based on specific referral data or details such as, for example and without limitation, state; specific services (e.g., different insurance lines may be assigned to different users); the relationship that provided the referral (e.g., referral was derived from a referral partner 206); and/or, a weighted distribution or other distribution of referrals among agents associated with the service provider 204.

The distribution of referrals, or load balance, among different agents recognizes that limitations may need to be placed on agents based on their specific needs and that different agents may have different workload capacities based on the nature of their work. For example, the service provider 204 or its companies 204A-204C may have an internal company policy that all insurance deals that come from Florida from ABC referral partner 206 should go to Jack Smith the underwriter because he is a specialist in Florida dealing with customers coming from ABC to seek insurance. In various embodiments, the referral system 202 can review a series of issues associated with referrals to determine which business specialist is best equipped to handle the referral. In another example, a customer of a referral partner 206 is seeking a small business loan for a doctor's office. The system 202 can be configured to route the loan referral to someone associated with the service provider 204 who specializes in loans to doctors and dentists.

Figure 24:
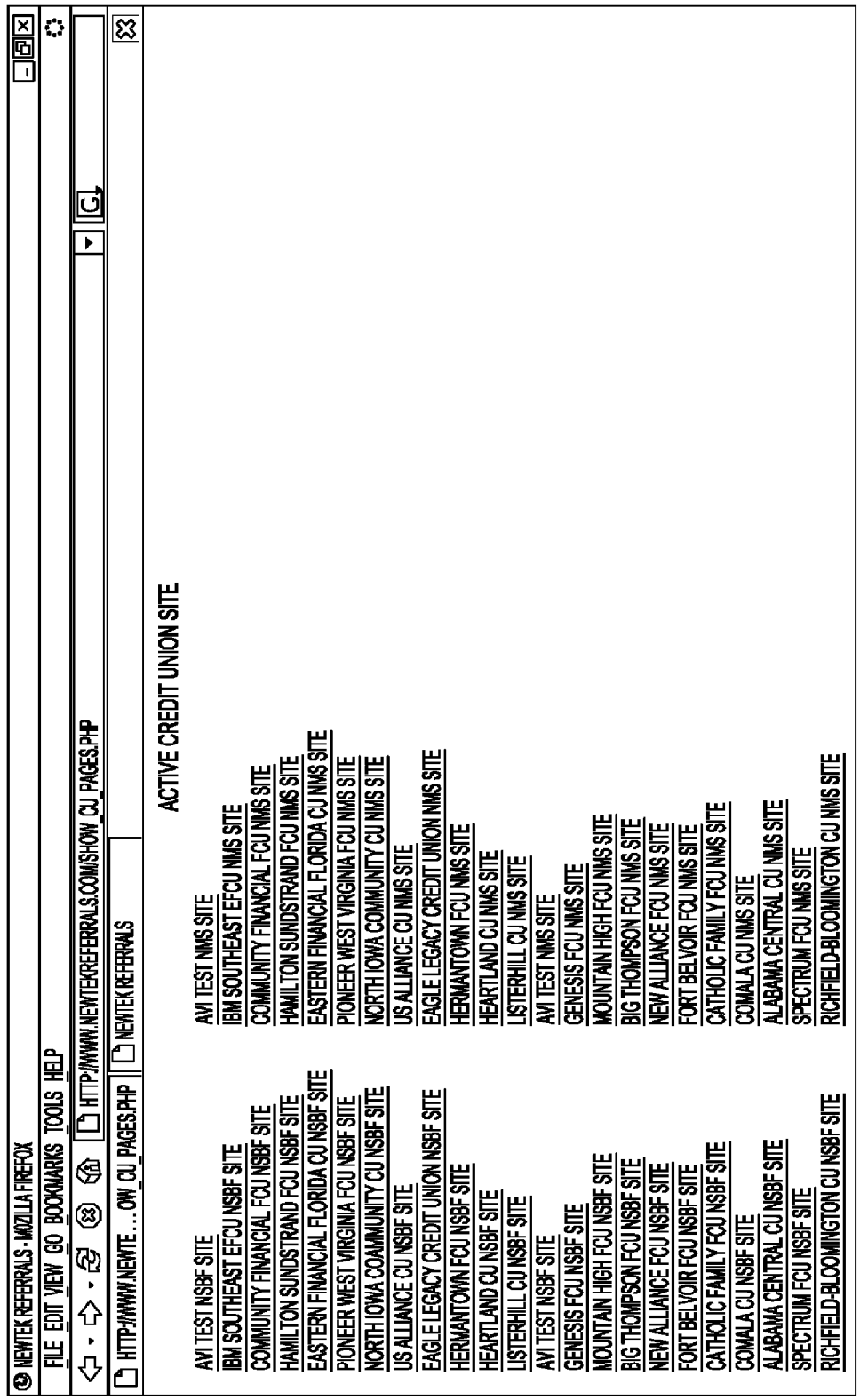

With reference to FIG. 24, the referral system 202 may permit users to access a list of active web sites for one or more of the referral partners 206. By clicking on a link, the user can be directed to the desired referral partner 206 web site.

With reference to FIG. 25, a main level of an example of a "partner performance report" is illustrated that can be generated in the referral system 202.

Figure 26A:
Figure 26B:
Figure 26C:
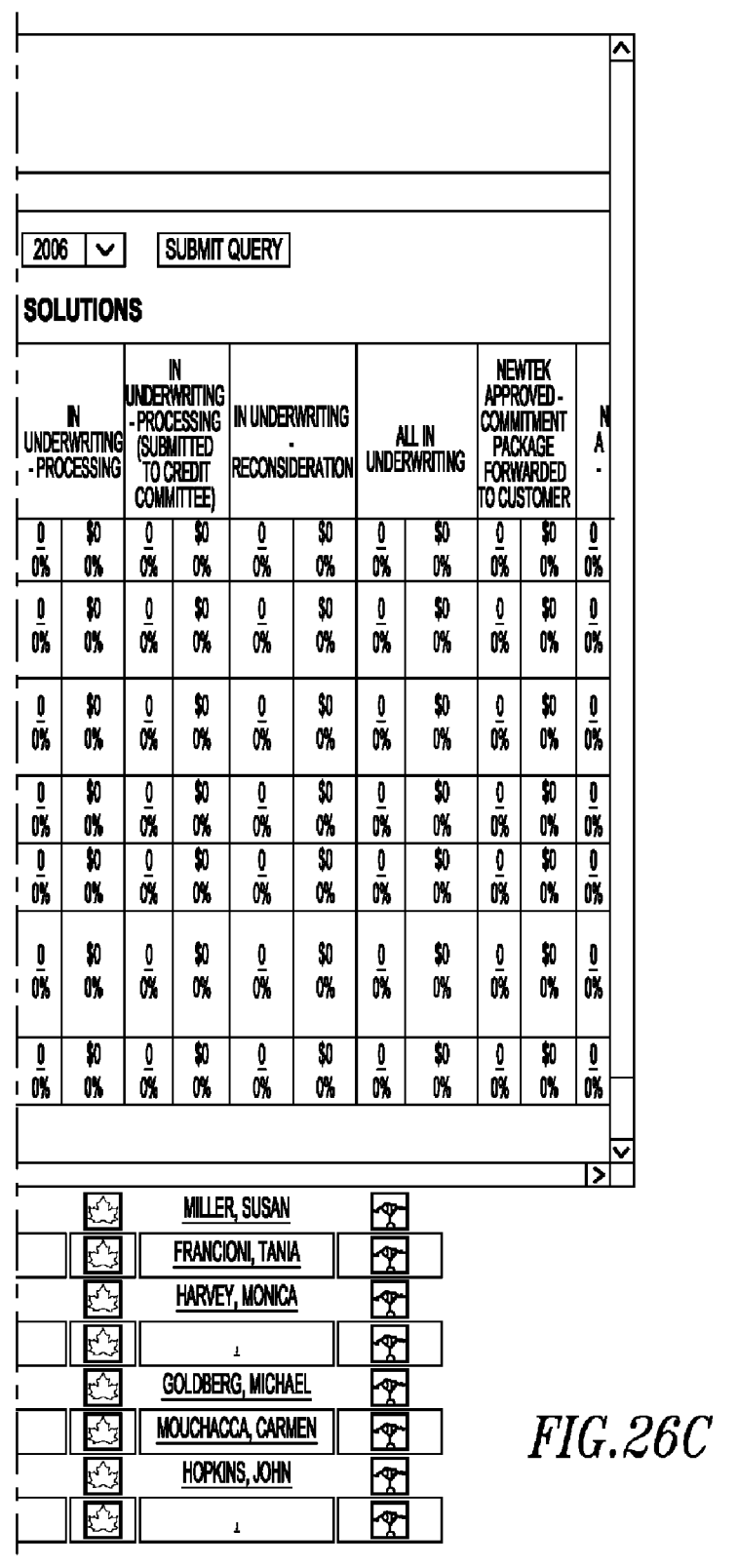

As shown in the exemplary screen display of FIG. 26, users can drill down from the main level of the partner performance report presented in FIG. 25 to obtain further detail on individual users of the referral system 202.

Figure 28B:
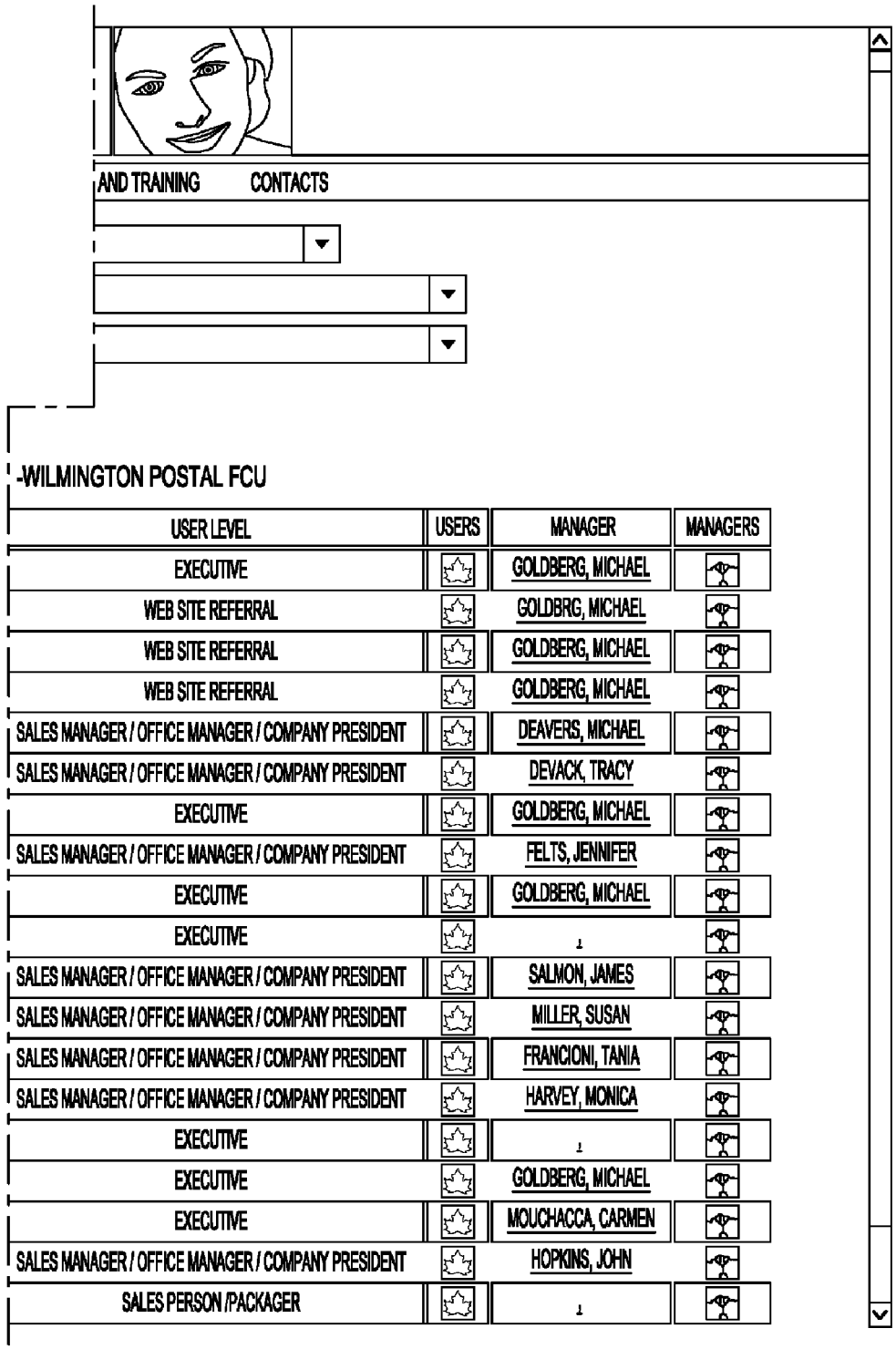

Referring now to FIG. 27, a main level of an example of a "user tree viewer" is shown. The user tree viewer can be used by managers or other supervisory personnel of the service provider 204 to display the user tree of which users are managed or supervised by which other users. It can be seen that the referral system 202 employs, in certain embodiments, a hybrid between the tree access model and a rights access model. The screen display of FIG. 28 illustrates the capability to drill down another level from the main level of the user tree viewer shown in FIG. 27.

With reference to FIG. 29, an example of a tool is shown that can be used to generate a "referral aging report" (as discussed above) with the prediction/diagnostics/report module 202G of the referral system 202.

With reference to FIG. 30, an example of a "user administration view" screen display is illustrated. As shown, a manager field and/or a company field can be used to determine access rights for a particular user.

Referring now to FIG. 31, a user configurable component of the work or referral routing system of the referral system 202 is illustrated in the screen display as shown. The screen display of FIG. 31 illustrates various examples of different features and functions of the system 202 described hereinabove.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD (digital versatile disc), CD (compact disc), memory stick, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. For example, the configuration of screen displays depicted herein are provided by way of example. There may be variations to the diagrams, screen displays, or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

What is claimed is:

1. A computer system for processing referrals of business opportunities between one or more referral partners and at least one service provider providing a service, the system comprising:
   a tracking processor; and
   one or more data storage devices operatively associated with the tracking processor, the one or more data storage devices configured to store referral data in compliance with at least one regulatory requirement,
wherein the processor is configured to process the referrals by:
   receiving referral data submitted by the referral partners, operatively associated with the tracking processor;
   determining that the service provider has accepted the referral and begun to provide the service;
   updating the status of at least one submitted business opportunity with at least one communication or milestone, after the service provider has accepted the business opportunity and begun to provide the service, each status update including a predefined service-dependent status code that describes workflow for the service;

using at least one system intercommunication standard to operate the referral system with at least two different systems configured for the referral partners to submit the referral data to the referral system;

generating a revenue forecast based at least on a referral conversion rate; and issuing payment of a referral fee to at least one referral partner when a submitted referral successfully closes.

2. The system of claim 1, further comprising:

wherein the system intercommunication standard includes an open Simple Object Access Protocol (SOAP) standard;

wherein the service provided by the service provider is one of the group consisting of tax services, merchant solutions, payment processing, credit card transactions, small business finance, loan services, information technology services, client services, and insurance;

the processor further configured to process by executing the service provided by the service provider by one or more companies affiliated with the service provider; and wherein the tracking processor comprises a web-based server.

3. The system of claim 1, wherein at least one referral update is one of the group consisting of status code, date of status update, updating user, notes on the update, and requested loan amount, and wherein the status code is one of the group consisting of open, closed, suspended, inquiries, closed and compensated, and dead.

4. The system of claim 1, the processor further configured to process by monitoring the progress of at least one in-process referral.

5. The system of claim 1, the processor further configured to process by communicating at least one notification in association with submission of the referral data, wherein the notification includes an e-mail notification, and wherein information included in the e-mail notification is one of the group consisting of name of business being referred, user that has submitted the referral, and company that has submitted the referral; and the system further comprising:
a link embedded in the e-mail notification for directing a user to a summary of the referral data, and
a link embedded in the e-mail notification for directing a user to an edit referral view screen.

6. The system of claim 1, further comprising:
the processor further configured to process by communicating a notification when a submitted referral is not updated within a predetermined time frame, by communicating a notification when a submitted referral closes, and by communicating a notification when a status code of a submitted referral changes.

7. The system of claim 1, the processor further configured to process by developing and generating a plurality of customized reports associated with the referral data and by generating a referral aging report.

8. The system of claim 1, the processor further configured to process by monitoring at least one of a referral conversion rate or a time frame as a submitted referral moves closer to completion.

9. The system of claim 1, the processor further configured to process by logging and recording transactions conducted on the referral system in at least one of the data storage devices, wherein data included in the logged transaction is one of the group consisting of updates of referrals, who performed a referral assignment, who was assigned a referral, when a referral was assigned, and page viewing information.

10. The system of claim 1, the processor further configured to process by displaying a view user screen configured to display information about a user of the referral system, wherein the information is one of the group consisting of open referrals assigned, closed referrals assigned, dead referrals assigned, and open referrals submitted.

11. The system of claim 1, the processor further configured to process by:

displaying a log history view screen configured to permit a user of the referral system to view the history of times that a user logged into the referral system, displaying information in the log history view displayed by user name, time of login, or number of logins, displaying a user search screen configured to facilitate searches for a particular user, wherein the user search screen is further configured to perform a search to find users who no longer have access to the referral system, and displaying another user screen configured to permit a first user to submit a referral for attribution to another user.

12. The system of claim 1, the processor further configured to process by making an auto assignment of at least one submitted referral based on the submitter or the company to which the referral is referred.

13. The system of claim 1, the processor further configured to process by making an auto assignment of at least one submitted referral based on a load balance of multiple agents associated with the service provider.

14. The system of claim 1, the processor further configured to process by:

operatively associating at least one accounting module with the tracking processor, operatively associating at least one external accounting system with the least one accounting module, and operatively associating at least one account module with the means for a referral fee payment module.

15. The system of claim 1, further comprising:

wherein at least one of the data storage devices comprises a central database segmented to provide access to multiple referral partners; and the processor further configured to process by:
operating at least one security module between at least one referral partner and the referral system, and
operating at least one security module between the service provider and the referral system.

16. A method for processing referrals of business opportunities between one or more referral partners and at least one service provider providing a service, using a tracking processor, and using one or more data storage devices configured to store referral data operatively associated with the tracking processor, the method comprising:

receiving referral data submitted by the referral partners, operatively associated with the tracking processor;

storing the referral data in compliance with at least one regulatory requirement in the one or more data storage devices;

determining that the service provider has accepted the referral and begun to provide the service;

updating the status of at least one submitted business opportunity with at least one communication or milestone, after the service provider has accepted the business opportunity and begun to provide the service, each status update including a predefined service-dependent status code that describes workflow for the service;

using at least one system intercommunication standard to operate the processor with at least two different systems configured for the referral partners to submit the referral data to the referral system;

generating a revenue forecast based at least on a referral conversion rate; and issuing payment of a referral fee to at least one referral partner when a submitted referral successfully closes.

17. The method of claim 16, further comprising:

wherein the system intercommunication standard includes an open Simple Object Access Protocol (SOAP) standard;

wherein the service provided by the service provider is one of the group consisting of tax services, merchant solutions, payment processing, credit card transactions, small business finance, loan services, information technology services, client services, and insurance;

executing the service provided by the service provider by one or more companies affiliated with the service provider; and wherein the tracking processor comprises a web-based server.

18. The method of claim 16, wherein at least one referral update is one of the group consisting of status code, date of status update, updating user, notes on the update, and requested loan amount, and wherein the status code is one of the group consisting of open, closed, suspended, inquiries, closed and compensated, and dead.

19. The method of claim 16, further comprising monitoring a progress of at least one in-process referral;

communicating at least one notification in association with submission of the referral data, wherein the notification includes an e-mail notification, and wherein information included in the e-mail notification is one of the group consisting of name of business being referred, user that has submitted the referral, and company that has submitted the referral;

embedding a link in the e-mail notification for directing a user to a summary of the referral data; and embedding a link in the e-mail notification for directing a user to an edit referral view screen.

20. The method of claim 16, further comprising communicating a notification when a submitted referral is not updated within a predetermined time frame;

communicating a notification when a submitted referral closes; and communicating a notification when a status code of a submitted referral changes.

21. The method of claim 16, further comprising developing and generating a plurality of customized reports associated with the referral data, and generating a referral aging report.

22. The method of claim 16, further comprising monitoring at least one of a referral conversion rate or a time frame as a submitted referral moves closer to completion.

23. The method of claim 16, further comprising logging and recording transactions conducted on the referral system in at least one of the data storage devices, wherein data included in the logged transaction is one of the group consisting of updates of referrals, who performed a referral assignment, who was assigned a referral, when a referral was assigned, and page viewing information.

24. The method of claim 16, further comprising displaying a view user screen configured to display information about a user of the referral system, wherein the information is one of the group consisting of open referrals assigned, closed referrals assigned, dead referrals assigned, and open referrals submitted.

25. The method of claim 16, further comprising displaying a log history view screen configured to permit a user of the referral system to view the history of times that a user logged into the referral system;

displaying information in the log history view displayed by user name, time of login, or number of logins;

displaying a user search screen configured to facilitate searches for a particular user, wherein the user search screen is further configured to perform a search to find users who no longer have access to the referral system; and displaying another user screen configured to permit a first user to submit a referral for attribution to another user.

26. The method of claim 16, further comprising making an auto assignment of at least one submitted referral based on the submitter or the company to which the referral is referred.

27. The method of claim 16, further comprising making an auto assignment of at least one submitted referral based on a load balance of multiple agents associated with the service provider.

28. The method of claim 16, further comprising operatively associating at least one accounting module with the tracking processor;

operatively associating at least one external accounting system with the least one accounting module; and operatively associating at least one account module with a referral fee payment module.

29. The method of claim 16, further comprising:

wherein at least one of the data storage devices comprises a central database segmented to provide access to multiple referral partners;

operating at least one security module between at least one referral partner and the referral system; and operating at least one security module between the service provider and the referral system.

30. A computer system for processing referrals of business opportunities between one or more referral partners and at least one service provider providing a service, the system comprising:

a tracking processor, adapted to electronically communicate with a number of referral partners, and with a number of service providers, and with a number of external accounting systems;

a referral data processing module in electronic communication with the trading processor;

a referral update module in electronic communication with the tracking processor, configured to update the status of at least one submitted business opportunity;

a prediction/diagnostics/report module in electronic communication with the tracking processor, and adapted to generate a revenue forecast based at least on a referral conversion rate;

a referral fee payment module in electronic communication with the tracking processor, and adapted to issue a payment of a referral fee to at least one referral partner when at least one submitted referral successfully closes; and data storage in electronic communication with the tracking processor, the data storage devices configured to store referral data in compliance with at least one regulatory requirement.

* * * * *

UNITED STATES PATENT AND TRADEMARK OFFICE
CERTIFICATE OF CORRECTION

| | | |
|---|---|---|
| PATENT NO. | : 8,271,326 B1 | Page 1 of 1 |
| APPLICATION NO. | : 11/516842 | |
| DATED | : September 18, 2012 | |
| INVENTOR(S) | : Brunet et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1142 days.

Signed and Sealed this
Sixteenth Day of September, 2014

Michelle K. Lee
*Deputy Director of the United States Patent and Trademark Office*